US012374287B2

(12) United States Patent
Hong et al.

(10) Patent No.: US 12,374,287 B2
(45) Date of Patent: Jul. 29, 2025

(54) DISPLAY DEVICE AND DRIVING METHOD

(71) Applicant: LG Display Co., Ltd., Seoul (KR)

(72) Inventors: Seokhyun Hong, Gyeonggi-do (KR); JungHyeon Kim, Gyeonggi-do (KR); Jaeik Yoo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/494,413

(22) Filed: Oct. 25, 2023

(65) Prior Publication Data

US 2024/0203349 A1 Jun. 20, 2024

(30) Foreign Application Priority Data

Dec. 14, 2022 (KR) ........................ 10-2022-0174494

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/045* (2013.01); *G09G 2330/021* (2013.01)

(58) Field of Classification Search
CPC ......... G09G 3/3233; G09G 2300/0819; G09G 2300/0842; G09G 2310/08; G09G 2320/0233; G09G 2320/045; G09G 2330/021; G09G 3/3208; G09G 3/20; G09G 2310/0243; G09G 2310/0264; G09G 3/3275; G09G 2300/043; G09G 2300/0809; G09G 2310/061
See application file for complete search history.

(56) References Cited

U.S. PATENT DOCUMENTS

| | | | | |
|---|---|---|---|---|
| 9,754,536 B2 * | 9/2017 | Chang | G09G 3/3233 | |
| 9,824,634 B2 * | 11/2017 | Miwa | G09G 3/3233 | |
| 10,074,306 B2 * | 9/2018 | Kim | G09G 3/3233 | |
| 10,204,565 B2 * | 2/2019 | Park | G09G 3/3291 | |
| 10,297,185 B2 * | 5/2019 | Choi | G09G 3/3258 | |
| 10,879,480 B2 * | 12/2020 | Shim | H10K 59/121 | |
| 11,073,929 B2 * | 7/2021 | Kim | G09G 3/3233 | |
| 11,081,052 B2 * | 8/2021 | Yang | G09G 3/3258 | |
| 2009/0033652 A1 * | 2/2009 | Uchino | G09G 3/3233 | 345/214 |
| 2009/0073095 A1 * | 3/2009 | Uchino | G09G 3/3233 | 345/77 |
| 2014/0062844 A1 * | 3/2014 | Yamamoto | G09G 3/3225 | 345/80 |
| 2015/0109280 A1 * | 4/2015 | Toyomura | G09G 3/3233 | 345/211 |
| 2015/0379937 A1 * | 12/2015 | Kim | G09G 3/3291 | 345/691 |
| 2017/0193912 A1 * | 7/2017 | Choi | G09G 3/3233 | |
| 2018/0096649 A1 * | 4/2018 | Lee | G09G 3/3233 | |

(Continued)

*Primary Examiner* — Jeff Piziali
(74) *Attorney, Agent, or Firm* — Seed IP Law Group LLP

(57) ABSTRACT

According to embodiments of the present disclosure, there may be provided a display device and a driving method. During a first type sensing time period during display driving, a voltage difference between a first node and a second node of a driving transistor is set to correspond to a threshold voltage stored in a memory, whereby it is possible to compensate for, in real time period, threshold voltage variations of driving transistors.

9 Claims, 11 Drawing Sheets

(56) References Cited

U.S. PATENT DOCUMENTS

| | | | | |
|---|---|---|---|---|
| 2019/0156747 | A1* | 5/2019 | Nie | G09G 3/3233 |
| 2020/0043414 | A1* | 2/2020 | Wang | G09G 3/3233 |
| 2020/0152135 | A1* | 5/2020 | Kang | G09G 3/3291 |
| 2020/0160794 | A1* | 5/2020 | Park | G09G 3/3291 |
| 2021/0104195 | A1* | 4/2021 | Choi | G09G 3/3258 |
| 2021/0407403 | A1* | 12/2021 | Yin | G09G 3/3618 |
| 2022/0013072 | A1* | 1/2022 | Kim | G09G 3/3291 |

* cited by examiner

DISPLAY DEVICE AND DRIVING METHOD

CROSS-REFERENCE TO RELATED APPLICATION

This application claims priority from Korean Patent Application No. 10-2022-0174494, filed on Dec. 14, 2022, which is hereby incorporated by reference for all purposes as if fully set forth herein.

BACKGROUND

Technical Field

Embodiments of the present disclosure relate to a display device and a driving method.

Description of the Related Art

Among display devices being currently developed, there is a self-luminous display device in which subpixels disposed in a display panel include light emitting elements. Each subpixel disposed in the display panel of such a self-luminous display device may include a light emitting element which emits light by itself and a driving transistor for driving the light emitting element.

Driving transistors disposed in the display panel of the self-luminous display device may have threshold voltages as unique characteristic values.

The driving transistor in each subpixel may degrade with the lapse of a driving time, and thus, the threshold voltage thereof may vary. There may be a difference in the driving time of each subpixel, and due to this fact, deviations in threshold voltage among the driving transistors may occur, resulting in deviations in luminance among the subpixels. The deviations in luminance among the subpixels may degrade the luminance uniformity of the display panel, and eventually, may serve as a major factor that degrades image quality. In consideration of this fact, various compensation technologies for sensing the threshold voltages of the driving transistors and compensating for deviations in threshold voltage have been developed.

BRIEF SUMMARY

The inventors have realized that in the case of a current threshold voltage compensation technology of the related art, a considerable time is required to sense the threshold voltage of one driving transistor. Therefore, it takes a very long time to sense the threshold voltages of all the driving transistors disposed in the display panel. Thus, in the case of the conventional threshold voltage compensation technology, a problem may arise in that the threshold voltages of the driving transistors cannot be sensed and compensated in real time during a display driving.

One or more embodiments of the present disclosure are directed to a display device and a driving method thereof, capable of compensating for, in real time, variations in threshold voltages of driving transistors during a display driving, thereby addressing the short comings of the proposed solutions in the related art Embodiments of the present disclosure are directed to a display device and a driving method thereof, capable of compensating for, in real time, variations in threshold voltages of driving transistors whose threshold voltages are negatively shifted during a display driving.

Embodiments of the present disclosure may provide a display device including: a plurality of data lines; a plurality of reference voltage lines; and a plurality of subpixels connected to the plurality of data lines and the plurality of reference voltage lines, wherein the plurality of data lines include a first data line which is connected to a first subpixel among the plurality of subpixels, and the plurality of reference voltage lines include a first reference voltage line which is connected to the first subpixel.

The first subpixel may include a first light emitting element, a first driving transistor, a first scan transistor and a first sensing transistor, a first node of the first driving transistor may be electrically connectable to the first data line through the first scan transistor, and a second node of the first driving transistor may be electrically connectable to the first reference voltage line through the first sensing transistor.

During a first type sensing time period for the first subpixel, a voltage of the second node of the first driving transistor may rise, and, before a voltage of the second node of the first driving transistor rises, a voltage difference between a sensing driving data voltage supplied to the first data line and a sensing driving reference voltage supplied to the first reference voltage line may be set to correspond to a threshold voltage of the first driving transistor in the first subpixel identified from threshold voltage-related information stored in a memory.

Embodiments of the present disclosure may provide a method for driving a display device, including: first step of setting a voltage value of at least one of a sensing driving data voltage and a sensing driving reference voltage; second step of, by applying the sensing driving data voltage to a first node of a driving transistor and applying the sensing driving reference voltage to a second node of the driving transistor, initializing the first node and the second node of the driving transistor; third step of, by floating the second node of the driving transistor, varying a voltage of the second node of the driving transistor; and fourth step of sampling a voltage of the second node of the driving transistor after a selected (or predetermined) time period elapses from a time point at which a voltage of the second node of the driving transistor is varied, wherein, in the first step, a voltage value of at least one of the sensing driving data voltage and the sensing driving reference voltage is set so that a difference between the sensing driving data voltage and the sensing driving reference voltage corresponds to a threshold voltage of the driving transistor.

Embodiments of the present disclosure may provide a display device including: a first subpixel including a first light emitting element, a first driving transistor, a first scan transistor and a first storage capacitor; and a second subpixel including a second light emitting element, a second driving transistor, a second scan transistor and a second storage capacitor, wherein, during a first blank time period, after a voltage difference between a first node and a second node of the first driving transistor of the first subpixel is initialized to a first control value, a voltage of the second node of the first driving transistor rises, and wherein, during a second blank time period after the first blank time period, after a voltage difference between a first node and a second node of the second driving transistor of the second subpixel is initialized to a second control value, a voltage of the second node of the second driving transistor does not rise.

Embodiments of the present disclosure may provide a display device including: a first subpixel including a first light emitting element, a first driving transistor, a first scan transistor and a first storage capacitor; and a second subpixel including a second light emitting element, a second driving transistor, a second scan transistor and a second storage capacitor, wherein, during a first blank time period, after a voltage difference between a first node and a second node of the first driving transistor of the first subpixel is initialized to a first control value, a voltage of the second node of the first driving transistor rises, and wherein, during a second blank time period after the first blank time period, after a voltage difference between a first node and a second node of the second driving transistor of the second subpixel is initialized to a second control value, a voltage of the second node of the second driving transistor rises and the second control value is set to be different from the first control value.

According to the embodiments of the present disclosure, it is possible to provide a display device and a driving method thereof, capable of compensating for, in real time, variations in threshold voltages of driving transistors during a display driving.

According to the embodiments of the present disclosure, it is possible to provide a display device and a driving method thereof, capable of compensating for, in real time, variations in threshold voltages of driving transistors whose threshold voltages are negatively shifted during a display driving.

According to the embodiments of the present disclosure, it is possible to provide a display device and a driving method thereof, capable of low power consumption by compensating for, in real time, variations in threshold voltages of driving transistors whose threshold voltages are negatively shifted.

As described above, the various embodiments of the present disclosure not only address the problems identified above but as well as other various technical problems found in the related art.

DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
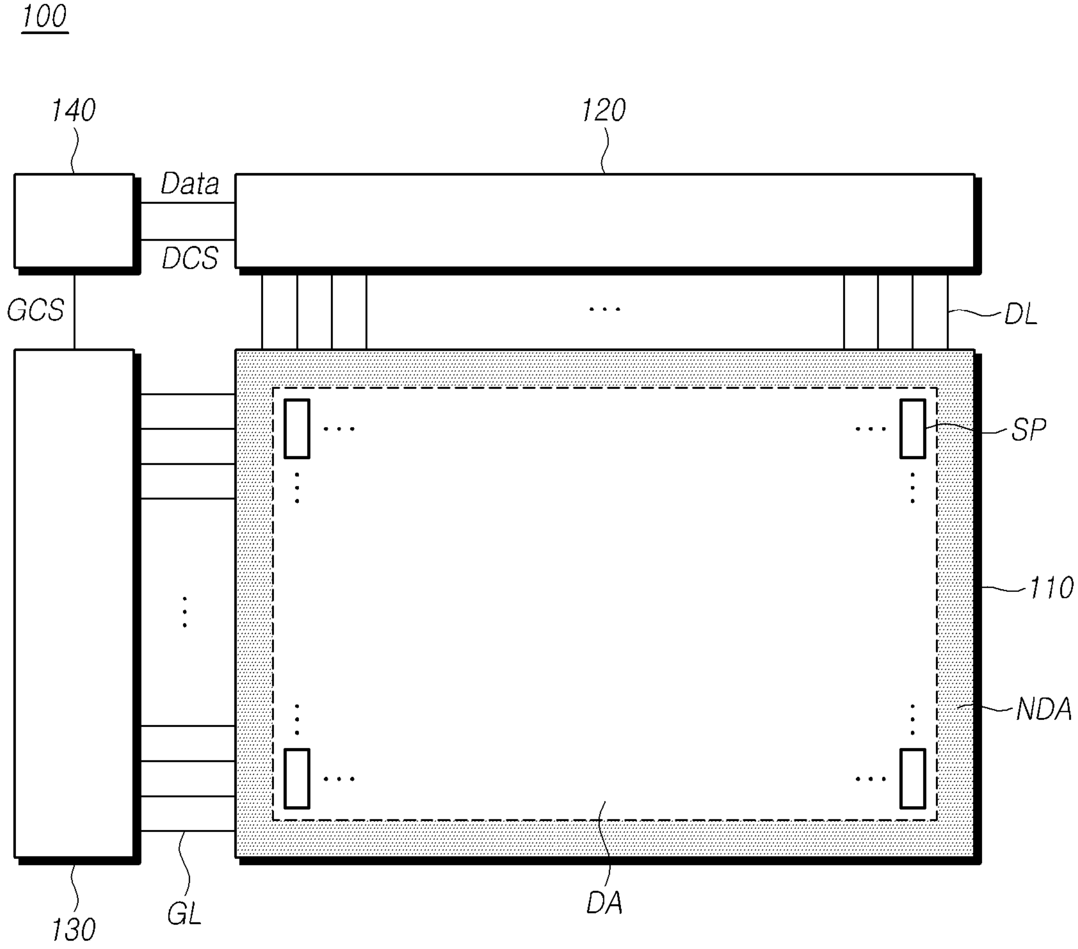
FIG. 1 is a system configuration diagram of a display device in accordance with embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a system configuration diagram of a display device 100 in accordance with embodiments of the present disclosure.

Referring to FIG. 1, the display device 100 in accordance with the embodiments of the present disclosure may include a display panel 110 and a driving circuit for driving the display panel 110.

The display panel 110 may include signal lines such as a plurality of data lines DL and a plurality of gate lines GL, and may include a plurality of subpixels SP. The display panel 110 may include a display area DA where an image is displayed and a non-display area NDA where an image is not displayed. In the display panel 110, the plurality of subpixels SP for displaying an image may be disposed in the display area DA, and, in the non-display area NDA, driving circuits 120, 130 and 140 may be electrically connected or mounted and pad parts to which integrated circuits or printed circuits are connected may be disposed.

The driving circuit may include a data driving circuit 120 and a gate driving circuit 130, and may further include a controller 140 which controls the data driving circuit 120 and the gate driving circuit 130.

The data driving circuit 120 as a circuit for driving the plurality of data lines DL may supply data signals to the plurality of data lines DL. The gate driving circuit 130 as a circuit for driving the plurality of gate lines GL may supply gate signals to the plurality of gate lines GL.

The gate driving circuit 130 may output a gate signal of a turn-on level voltage or a gate signal of a turn-off level voltage under the control of the controller 140. By sequentially supplying a gate signal of a turn-on level voltage to the plurality of gate lines GL, the gate driving circuit 130 may sequentially drive the plurality of gate lines GL.

In order to control the operation timing of the data driving circuit 120, the controller 140 may supply a data control signal DCS to the data driving circuit 120. The controller 140 may supply a gate control signal GCS for controlling the operation timing of the gate driving circuit 130 to the gate driving circuit 130.

The controller 140 may start a scan according to a timing implemented in each frame, may convert input image data inputted from the outside to be suitable for a data signal format used in the data driving circuit 120 and supply converted image data Data to the data driving circuit 120, and may control a driving of data at a proper time corresponding to the scan.

In order to control the data driving circuit 120 and the gate driving circuit 130, the controller 140 receives a vertical synchronization signal Vsync, a horizontal synchronization signal Hsync, an input data enable signal DE and a clock signal CLK, generates the various control signals DCS and GCS, and outputs the various control signals DCS and GCS to the data driving circuit 120 and the gate driving circuit 130.

The controller 140 may be implemented as a component separate from the data driving circuit 120, or may be implemented as an integrated circuit by being integrated with the data driving circuit 120.

The data driving circuit 120 receives the image data Data from the controller 140, and supplies a data voltage to the plurality of data lines DL, thereby driving the plurality of data lines DL. The data driving circuit 120 is also referred to as a source driving circuit. Such a data driving circuit 120 may include at least one source driver integrated circuit (SDIC). Each source driver integrated circuit (SDIC) may include a shift register, a latch circuit, a digital-to-analog converter (DAC), an output buffer, and so forth. As the case may be, each source driver integrated circuit (SDIC) may further include an analog-to-digital converter (ADC).

For example, each source driver integrated circuit (SDIC) may be connected to the display panel 110 in a tape automated bonding (TAB) method, may be connected to bonding pads of the display panel 110 in a chip-on-glass (COG) or chip-on-panel (COP) method, or may be connected to the display panel 110 by being implemented in a chip-on-film (COF) method.

The gate driving circuit 130 may be connected to the display panel 110 in the tape automated bonding (TAB) method, may be connected to bonding pads of the display panel 110 in the chip-on-glass (COG) or chip-on-panel (COP) method, or may be connected to the display panel 110 according to the chip-on-film (COF) method. Alternatively, the gate driving circuit 130 may be formed in the non-display area NDA of the display panel 110 in a gate-in-panel (GIP) type.

When a specific gate line GL is turned on by the gate driving circuit 130, the data driving circuit 120 may convert the image data Data received from the controller 140 into the data voltage of an analog form, and may supply the data voltage to the plurality of data lines DL.

The data driving circuit 120 may be disposed on one side (e.g., the top side or the bottom side) of the display panel 110. Depending on a driving method, a panel design method, etc., the data driving circuit 120 may be disposed on both sides (e.g., the top side and the bottom side) of the display panel 110, or may be disposed on at least two sides of the four sides of the display panel 110.

The gate driving circuit 130 may be disposed on one side (e.g., the left side or the right side) of the display panel 110. Depending on a driving method, a panel design method, etc., the gate driving circuit 130 may be disposed on both sides (e.g., the left side and the right side) of the display panel 110, or may be disposed on at least two sides of the four sides of the display panel 110.

The controller 140 may be a timing controller which is used in a typical display technology, may be a control device which includes a timing controller and further performs other control functions, may be a control device which is different from a timing controller, or may be a circuit in a control device. The controller 140 may be implemented by various circuits or electronic parts such as an integrated circuit (IC), a field programmable gate array (FPGA), an application specific integrated circuit (ASIC) and a processor.

The controller 140 may be mounted on a printed circuit board, a flexible printed circuit board or the like, and may be electrically connected to the data driving circuit 120 and the gate driving circuit 130 through the printed circuit board, the flexible printed circuit board or the like. The controller 140 may transmit and receive signals to and from the data driving circuit 120 through at least one selected (or predetermined) interface. For example, the interface may include a low voltage differential signaling (LVDS) interface, an EPI interface, a Serial Peripheral Interface (SPI), etc. The controller 140 may include a storage such as at least one register.

The display device 100 in accordance with the embodiments of the present disclosure may be a self-luminous display such as an organic light emitting diode (OLED) display, a quantum dot display or a micro light emitting diode (micro LED) display.

Figure 2:
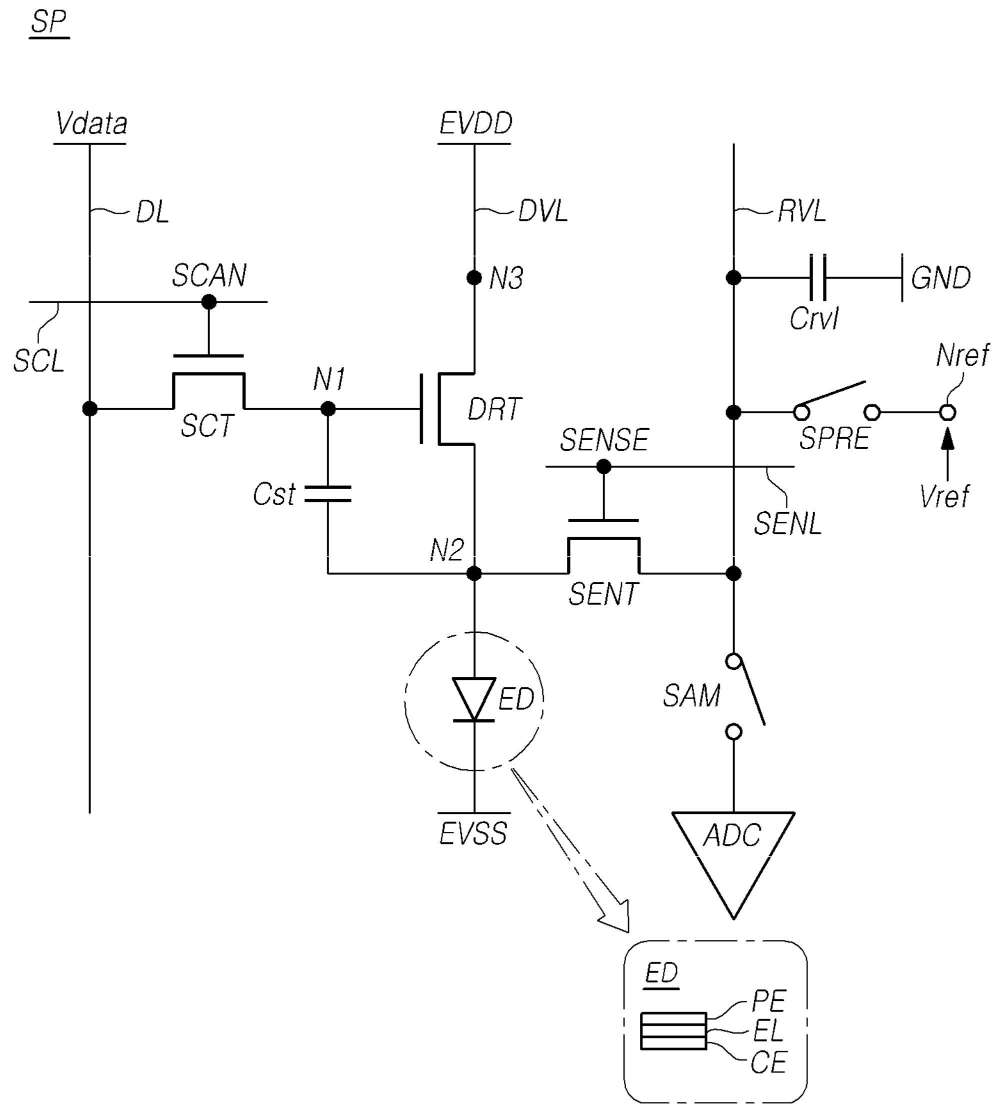
FIG. 2 is an equivalent circuit diagram of a subpixel of a display device in accordance with embodiments of the present disclosure.

FIG. 2 is an equivalent circuit diagram of a subpixel SP of a display device 100 in accordance with embodiments of the present disclosure.

Referring to FIG. 2, each of the plurality of subpixels SP disposed in the display panel 110 of the display device 100 in accordance with the embodiments of the present disclosure may include a light emitting element ED, a driving transistor DRT, a scan transistor SCT, a sensing transistor SENT, and a storage capacitor Cst. As such, when the subpixel SP includes three transistors DRT, SCT and SENT and one capacitor Cst, the subpixel SP is referred to as having a 3T (transistor)1C (capacitor) structure.

The light emitting element ED may include a pixel electrode PE, a common electrode CE, and a light emitting layer EL which is positioned between the pixel electrode PE and the common electrode CE. The pixel electrode PE may be disposed in each subpixel SP, and the common electrode CE may be disposed in common in a plurality of subpixels SP. For example, the pixel electrode PE may be an anode electrode, and the common electrode CE may be a cathode electrode. For another example, the pixel electrode PE may be a cathode electrode, and the common electrode CE may be an anode electrode. For example, the light emitting element ED may be an organic light emitting diode (OLED), a micro light emitting diode (micro LED) or a quantum dot light emitting element.

The driving transistor DRT as a transistor for driving the light emitting element ED may have a first node N1, a second node N2 and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, may be electrically connected to a source node or a drain node of the sensing transistor SENT, and may also be electrically connected to the pixel electrode PE of the light emitting element ED. The third node N3 of the driving transistor DRT may be electrically connected to a driving voltage line DVL which supplies a driving voltage EVDD.

The scan transistor SCT may be controlled by a scan signal SCAN, and may be connected between the first node N1 of the driving transistor DRT and the data line DL. The scan transistor SCT may be turned on or off according to the scan signal SCAN supplied from a scan signal line SCL which is one kind of gate line GL, thereby controlling connection between the data line DL and the first nodes N1 of the driving transistor DRT.

The scan transistor SCT may be turned on by the scan signal SCAN having a turn-on level voltage, and thereby, may transfer a data voltage Vdata supplied from the data line DL to the first node N1 of the driving transistor DRT.

The turn-on level voltage of the scan signal SCAN capable of turning on the scan transistor SCT may be a high level voltage or a low level voltage. A turn-off level voltage of the scan signal SCAN capable of turning off the scan transistor SCT may be a low level voltage or a high level voltage. For example, when the scan transistor SCT is an n-type transistor, the turn-on level voltage may be a high level voltage and the turn-off level voltage may be a low level voltage. For another example, when the scan transistor SCT is a p-type transistor, the turn-on level voltage may be a low level voltage and the turn-off level voltage may be a high level voltage.

The sensing transistor SENT may be controlled by a sense signal SENSE, and may be connected between the second node N2 of the driving transistor DRT and a reference voltage line RVL. The sensing transistor SENT may be turned on or off according to the sense signal SENSE supplied from a sense signal line SENL which is another kind of gate line GL, thereby controlling connection between the reference voltage line RVL and the second node N2 of the driving transistor DRT.

The sensing transistor SENT may be turned on by the sense signal SENSE having a turn-on level voltage, and thereby, may transfer a reference voltage Vref supplied from the reference voltage line RVL to the second node N2 of the driving transistor DRT.

The turn-on level voltage of the sense signal SENSE capable of turning on the sensing transistor SENT may be a high level voltage or a low level voltage. The turn-off level voltage of the sense signal SENSE capable of turning off the sensing transistor SENT may be a low level voltage or a high level voltage. For example, when the sensing transistor SENT is an n-type transistor, the turn-on level voltage may be a high level voltage and the turn-off level voltage may be a low level voltage. For another example, when the sensing transistor SENT is a p-type transistor, the turn-on level voltage may be a low level voltage and the turn-off level voltage may be a high level voltage.

The display device 100 may further include a line capacitor Crvl which is formed between the reference voltage line RVL and a ground GND, a sampling switch SAM which controls connection between the reference voltage line RVL and the analog-to-digital converter ADC, and a power switch SPRE which controls connection between the reference voltage line RVL and a reference voltage supply node Nref. The reference voltage Vref outputted from a power supply device may be supplied to the reference voltage supply node Nref, and may be applied to the reference voltage line RVL through the power switch SPRE.

The sensing transistor SENT may be turned on by the sense signal SENSE having a turn-on level voltage, and thereby, may transfer a voltage V2 of the second node N2 of the driving transistor DRT to the reference voltage line RVL. Accordingly, the line capacitor Crvl which is formed between the reference voltage line RVL and the ground GND may be charged.

The function of the sensing transistor SENT to transfer the voltage V2 of the second node N2 of the driving transistor DRT to the reference voltage line RVL may be used during a driving to sense the characteristic value of the subpixel SP. In this case, a voltage transferred to the reference voltage line RVL may be a voltage for calculating the characteristic value of the subpixel SP or a voltage on which the characteristic value of the subpixel SP is reflected.

In the present disclosure, the characteristic value of the subpixel SP may be the characteristic value of the driving transistor DRT or the light emitting element ED. The characteristic value of the driving transistor DRT may include the threshold voltage and mobility of the driving transistor DRT. The characteristic value of the light emitting element ED may include the threshold voltage of the light emitting element ED.

Each of the driving transistor DRT, the scan transistor SCT and the sensing transistor SENT may be an n-type transistor or a p-type transistor. In the present disclosure, for the sake of convenience in explanation, it is exemplified that each of the driving transistor DRT, the scan transistor SCT and the sensing transistor SENT is an n-type transistor.

The storage capacitor Cst may be connected between the first node N1 and the second node N2 of the driving transistor DRT. The storage capacitor Cst is charged with an amount of charge corresponding to a voltage difference between both ends, and serves to maintain the voltage difference between both ends for a selected (or predetermined) frame time period. Accordingly, during the selected (or predetermined) frame time period, the corresponding subpixel SP may emit light.

The storage capacitor Cst may not be a parasitic capacitor (e.g., Cgs or Cgd) which is an internal capacitor existing between the gate node and the source node (or the drain node) of the driving transistor DRT, but may be an external capacitor which is intentionally designed outside the driving transistor DRT.

The scan signal line SCL and the sense signal line SENL may be different gate lines GL. In this case, the scan signal SCAN and the sense signal SENSE may be separate gate signals from each other, and an on-off timing of the scan transistor SCT and an on-off timing of the sensing transistor SENT in one subpixel SP may be independent of each other. In other words, the on-off timing of the scan transistor SCT and the on-off timing of the sensing transistor SENT in one subpixel SP may be the same or different.

Unlike this, the scan signal line SCL and the sense signal line SENL may be the same gate line GL. Namely, a gate node of the scan transistor SCT and a gate node of the sensing transistor SENT in one subpixel SP may be connected to one gate line GL. In this case, the scan signal SCAN and the sense signal SENSE may be the same gate signal, and an on-off timing of the scan transistor SCT and an on-off timing of the sensing transistor SENT in one subpixel SP may be the same as each other.

The reference voltage line RVL may be disposed for each one column of subpixels SP. Unlike this, the reference voltage line RVL may be disposed for each two columns of subpixels SP. When the reference voltage line RVL is disposed for each two columns of subpixels SP, a plurality of subpixels SP may be supplied with the reference voltage Vref from one reference voltage line RVL.

The driving transistor DRT included in each of the plurality of subpixels SP disposed in the display panel 110 of the display device 100 in accordance with the embodiments of the present disclosure may have a unique characteristic value. For example, the unique characteristic value of the driving transistor DRT may include a threshold voltage and a mobility.

The characteristic value of the driving transistor DRT included in each of the plurality of subpixels SP may vary with the lapse of a driving time. Driving times of the plurality of subpixels SP are not all the same. That is to say, driving times of some of the plurality of subpixels SP may be different from driving times of the rest. Accordingly, characteristic values of the driving transistors DRT of some subpixels SP among the plurality of subpixels SP may be different from characteristic values of the driving transistors DRT of the other subpixels SP.

Due to deviations in characteristic value among a plurality of driving transistors DRT disposed in the display panel 110, deviations in luminance among the plurality of subpixels SP disposed in the display panel 110 may occur. Accordingly, nonuniformity in the luminance of the display panel 110 may occur.

In consideration of this fact, the display device 100 in accordance with the embodiments of the present disclosure may perform a sensing driving on the subpixels SP of the display panel 110 to sense characteristic values of the driving transistors DRT, and may provide a compensation function for reducing deviations in characteristic value among the driving transistors DRT. In this regard, hereinbelow, two sensing driving methods will be described with reference to FIGS. 3 and 4.

Figure 3:
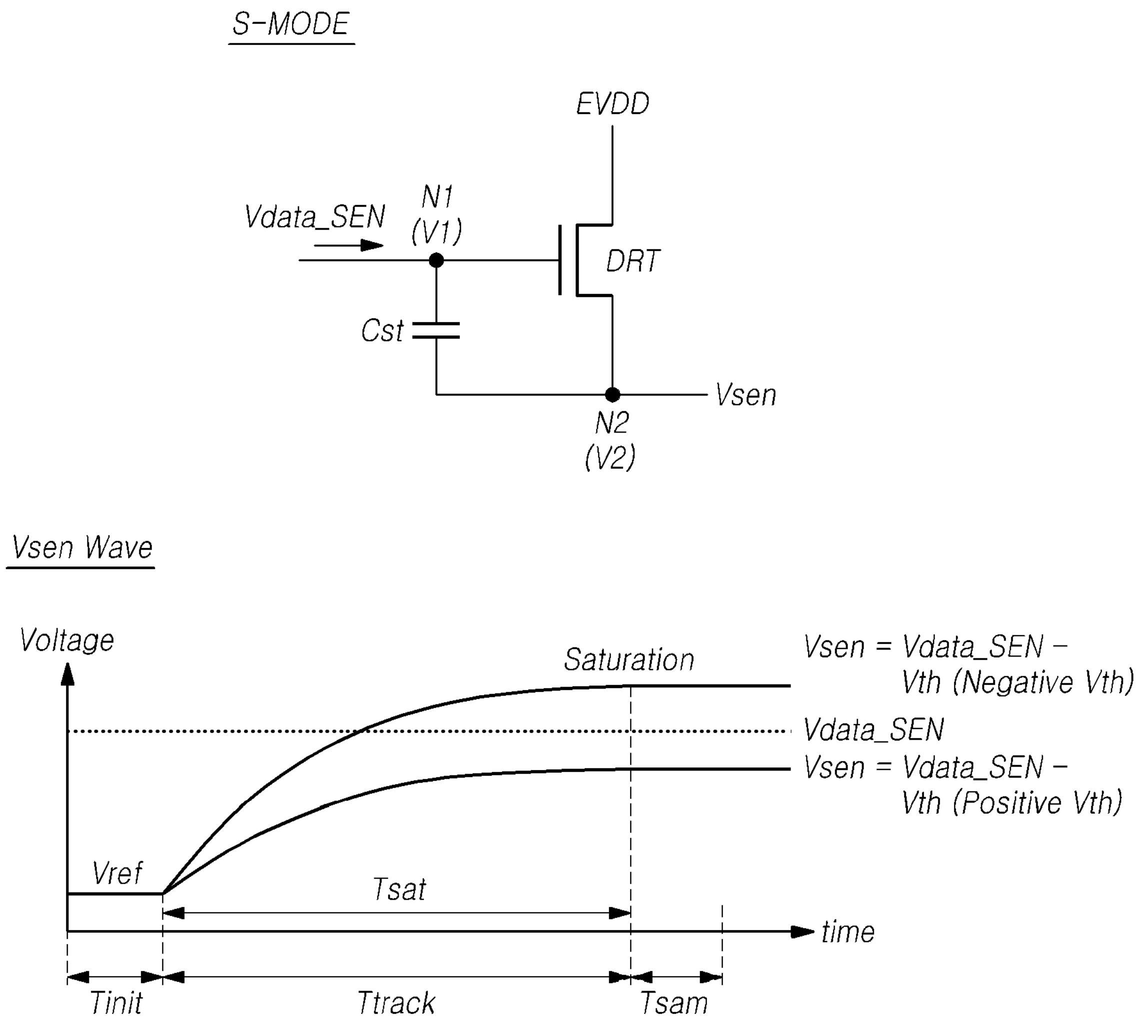
FIG. 3 is a diagram for explaining a slow-mode sensing driving of a display device in accordance with embodiments of the present disclosure.
Figure 4:
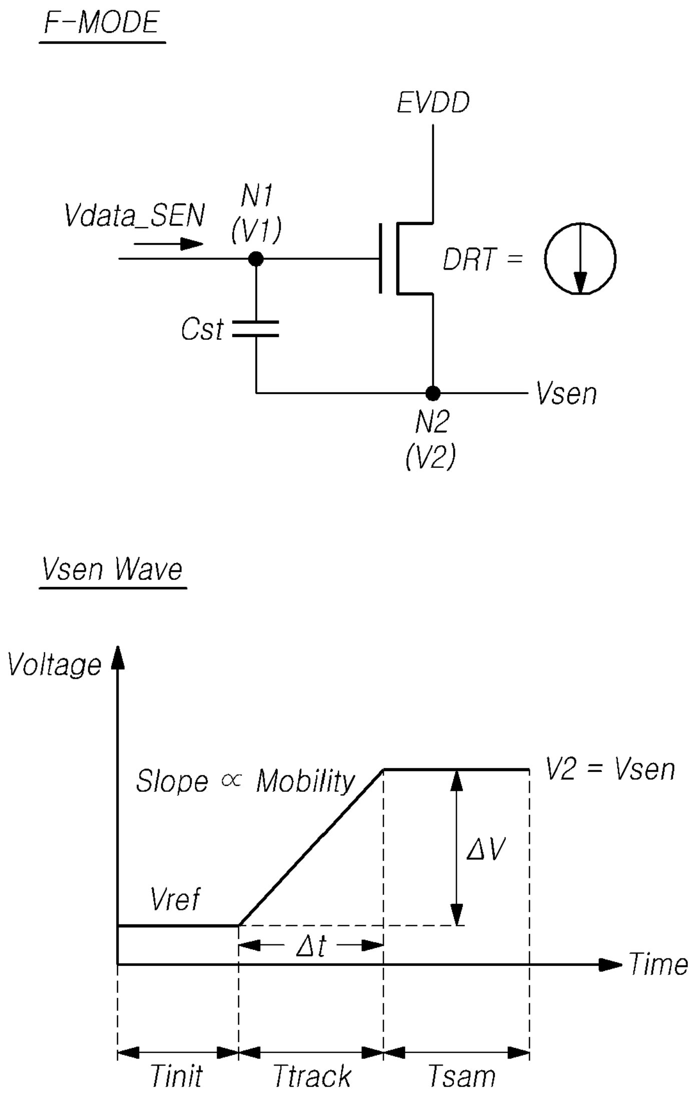
FIG. 4 is a diagram for explaining a fast-mode sensing driving of a display device in accordance with embodiments of the present disclosure.

FIG. 3 is a diagram for explaining a slow-mode (hereinafter, referred to as "S-mode") sensing driving of a display device 100 in accordance with embodiments of the present disclosure, and FIG. 4 is a diagram for explaining a fast-mode (hereinafter, referred to as "F-mode") sensing driving of a display device 100 in accordance with embodiments of the present disclosure.

Referring to FIG. 3, an S-mode is a mode in which the subpixel SP is driven for a long time to sense the characteristic value of the driving transistor DRT. Referring to FIG. 4, an F-mode is a mode in which the subpixel SP is driven for a short time to sense the characteristic value of the driving transistor DRT.

Referring to FIGS. 3 and 4, each of the sensing driving time period of the S-mode and the sensing driving time period of the F-mode may include an initialization time period Tinit, a tracking time period Ttrack and a sampling time period Tsam. Hereinbelow, the sensing driving time period of the S-mode and the sensing driving time period of the F-mode will be described.

First, the sensing driving time period of the S-mode of the display device will be described with reference to FIG. 3.

Referring to FIG. 3, the initialization time period Tinit of the sensing driving time period of the S-mode is a time period for initializing the first node N1 and the second node N2 of the driving transistor DRT. During the initialization time period Tinit, the scan transistor SCT and the sensing transistor SENT may be turned on, and the power switch SPRE may be turned on.

During the initialization time period Tinit, a voltage V1 of the first node N1 of the driving transistor DRT is initialized to a sensing driving data voltage Vdata_SEN, and a voltage V2 of the second node N2 of the driving transistor DRT is initialized to the sensing driving reference voltage Vref.

Referring to FIG. 3, the tracking time period Ttrack of the sensing driving time period of the S-mode is a time period for boosting the voltage V2 of the second node N2 of the driving transistor DRT until the voltage V2 of the second node N2 of the driving transistor DRT reflects the characteristic value or a variation in the characteristic value of the driving transistor DRT.

During the tracking time period Ttrack, the first node N1 of the driving transistor DRT is in a constant voltage state having the sensing driving data voltage Vdata_SEN, but the voltage V2 of the second node N2 of the driving transistor DRT may rise and then saturate.

When the tracking time period Ttrack begins, the voltage difference between the first node N1 and the second node N2 of the driving transistor DRT initialized during the initialization time period Tinit may be equal to or greater than a threshold voltage Vth of the driving transistor DRT. In this case, the driving transistor DRT is turned on to conduct a driving current. When the first node N1 and the second node N2 of the driving transistor DRT are a gate node and a source node, respectively, a difference in voltage between the first node N1 and the second node N2 of the driving transistor DRT becomes Vgs. Therefore, in the case where the difference Vgs in voltage between the first node N1 and the second node N2 of the driving transistor DRT is equal to or greater than the threshold voltage Vth, when the tracking time period Ttrack begins, the voltage V2 of the second node N2 of the driving transistor DRT may rise.

For example, the characteristic value of the driving transistor DRT may be the threshold voltage Vth of the driving transistor DRT. In this case, the voltage V2 of the second node N2 of the driving transistor DRT is changed until the voltage V2 of the second node N2 of the driving transistor DRT becomes the threshold voltage Vth or a voltage that reflects a variation thereof.

Accordingly, the tracking time period Ttrack is a time period that tracks the voltage V2 of the second node N2 of the driving transistor DRT capable of reflecting the threshold voltage Vth of the driving transistor DRT or a variation thereof.

During the tracking time period Ttrack, as the power switch SPRE is turned off or the sensing transistor SENT is turned off, the second node N2 of the driving transistor DRT is floated. Accordingly, the voltage V2 of the second node N2 of the driving transistor DRT rises. The voltage V2 of the second node N2 of the driving transistor DRT does not continuously rise, but rises and then eventually saturates as a rising rate thereof decreases.

The saturated voltage V2 of the second node N2 of the driving transistor DRT may correspond to a difference Vdata−Vth between the data voltage Vdata and the threshold voltage Vth or a difference Vdata−ΔVth between the data voltage Vdata and a threshold voltage deviation ΔVth.

When the voltage V2 of the second node N2 of the driving transistor DRT saturates, the sampling time period Tsam may begin. The sampling time period Tsam is a time period for measuring the threshold voltage Vth of the driving transistor DRT or a voltage Vdata−Vth or Vdata−ΔVth reflecting a variation thereof.

During the sampling time period Tsam of the sensing driving time period of the S-mode, the analog-to-digital converter ADC connected to the reference voltage line RVL senses the voltage of the reference voltage line RVL. The voltage of the reference voltage line RVL may correspond to the voltage V2 of the second node N2 of the driving transistor DRT, and may correspond to the charging voltage of the line capacitor Crvl which is formed on the reference voltage line RVL.

During the sampling time period Tsam, a sensing voltage Vsen sensed by the analog-to-digital converter ADC may be the voltage Vdata−Vth obtained by subtracting the threshold voltage Vth from the data voltage Vdata or the voltage Vdata−ΔVth obtained by subtracting the threshold voltage deviation ΔVth from the data voltage Vdata. The threshold voltage Vth may be a positive threshold voltage or a negative threshold voltage.

During the tracking time period Ttrack, a time Tsat required for the voltage V2 of the second node N2 of the driving transistor DRT to rise and then saturate is a time period required for the threshold voltage Vth of the driving transistor DRT or a variation thereof to be reflected by the voltage V2 (V2=Vdata−Vth) of the second node N2 of the driving transistor DRT, and determines the overall temporal length of the sensing driving time period of the S-mode.

In the case of the S-mode, the fairly long time Tsat for the voltage V2 of the second node N2 of the driving transistor DRT to rise and saturate is required. Therefore, the sensing driving method, in which the voltage V2 of the second node N2 of the driving transistor DRT is boosted and then saturated so that the voltage V2 of the second node N2 of the driving transistor DRT represents the characteristic value of the driving transistor DRT, is referred to as the S-mode.

The sensing driving time period of the F-mode of the display device will be described with reference to FIG. 4.

Referring to FIG. 4, the initialization time period Tinit of the sensing driving time period of the F-mode is a time period for initializing the first node N1 and the second node N2 of the driving transistor DRT. During the initialization time period Tinit, the scan transistor SCT and the sensing transistor SENT may be turned on, and the power switch SPRE may be turned on.

During the initialization time period Tinit, a voltage V1 of the first node N1 of the driving transistor DRT is initialized to a sensing driving data voltage Vdata_SEN, and a voltage V2 of the second node N2 of the driving transistor DRT is initialized to the sensing driving reference voltage Vref.

Referring to FIG. 4, the tracking time period Ttrack of the sensing driving time period of the F-mode is a time period for changing the voltage V2 of the second node N2 of the driving transistor DRT for a preset tracking time period Δt until the voltage V2 of the second node N2 of the driving transistor DRT becomes a voltage that reflects the characteristic value or a variation in the characteristic value of the driving transistor DRT.

During the tracking time period Ttrack, the preset tracking time period Δt may be set to be short. Therefore, during the short tracking time period Δt, it is difficult for the voltage V2 of the second node N2 of the driving transistor DRT to reflect the threshold voltage Vth. Thus, the F-mode is a sensing driving method for sensing the mobility of the driving transistor DRT.

During the tracking time period Ttrack, as the power switch SPRE is turned off or the sensing transistor SENT is turned off, the second node N2 of the driving transistor DRT is floated. During the tracking time period Ttrack, by the scan signal SCAN of the turn-off level voltage, the scan transistor SCT may be turned off, and the first node N1 of the driving transistor DRT may also be floated.

When the tracking time period Ttrack begins, a voltage difference Vgs between the first node N1 and the second node N2 of the driving transistor DRT initialized during the initialization time period Tinit may be equal to or greater than the threshold voltage Vth of the driving transistor DRT. In this case, the driving transistor DRT is turned on to conduct a driving current. When the first node N1 and the second node N2 of the driving transistor DRT are a gate node and a source node, respectively, a difference in voltage between the first node N1 and the second node N2 of the driving transistor DRT becomes Vgs.

Therefore, in the case where the difference Vgs in voltage between the first node N1 and the second node N2 of the driving transistor DRT is equal to or greater than the threshold voltage Vth, when the tracking time period Ttrack begins, the voltage V2 of the second node N2 of the driving transistor DRT may be boosted. At this time, the voltage V1 of the first node N1 of the driving transistor DRT may also be boosted.

During the tracking time Ttrack, a speed at which the voltage V2 of the second node N2 of the driving transistor DRT rises varies depending on the current transfer capability (i.e., mobility) of the driving transistor DRT. As the current transfer capability (mobility) of the driving transistor DRT is larger, the voltage V2 of the second node N2 of the driving transistor DRT may rise more steeply.

After the tracking time period Ttrack proceeds for the preset tracking time period Δt, that is, after the voltage V2 of the second node N2 of the driving transistor DRT rises for the preset tracking time period Δt, the sampling time period Tsam may proceed. During the tracking time period Ttrack, a speed at which the voltage V2 of the second node N2 of the driving transistor DRT rises corresponds to a voltage variation ΔV during the preset tracking time period Δt.

A sensing voltage Vsen sensed by the analog-to-digital converter ADC is a voltage which has risen by the voltage variation ΔV from the reference voltage Vref during the constant sampling time period Δt, and is a voltage which corresponds to the mobility of the driving transistor DRT.

Referring to FIG. 4, during the sampling time period Tsam of the sensing driving time period of the F-mode, the sensing voltage Vsen sensed by the analog-to-digital converter ADC may vary depending on the mobility of the driving transistor DRT. As the driving transistor DRT has a higher mobility, the sensing voltage Vsen becomes higher. As the driving transistor DRT has a lower mobility, the sensing voltage Vsen becomes lower.

During the tracking time period Ttrack, the preset tracking time period Δt may be set to be short. In this sense, the sensing driving method, in which the voltage V2 of the second node 5N2 of the driving transistor DRT is sampled by changing the voltage V2 of the second node N2 of the driving transistor DRT for the preset tracking time period Δt, is referred to as the F (fast)-mode.

The display device 100 may determine the threshold voltage Vth of the driving transistor DRT or a variation thereof in the corresponding subpixel SP on the basis of the sensing voltage Vsen sensed through the S-mode, may calculate a threshold voltage compensation value that reduces or eliminates a deviation in threshold voltage between driving transistors DRT, and may store the calculated threshold voltage compensation value in a memory.

The display device 100 may determine the mobility of the driving transistor DRT or a variation thereof in the corresponding subpixel SP on the basis of the sensing voltage Vsen sensed through the F-mode, may calculate a mobility compensation value that reduces or eliminates a deviation in mobility between driving transistors DRT, and may store the calculated mobility compensation value in a memory.

When supplying the data voltage Vdata for a display driving to the corresponding subpixel SP, the display device 100 may supply the data voltage Vdata varied on the basis of the threshold voltage compensation value and the mobility compensation value.

According to the above description, a threshold voltage sensing may be performed in the S-mode due to a characteristic requiring a long sensing time period, and a mobility sensing may be performed in the F-mode due to a characteristic only requiring a short sensing time period.

Figure 5:
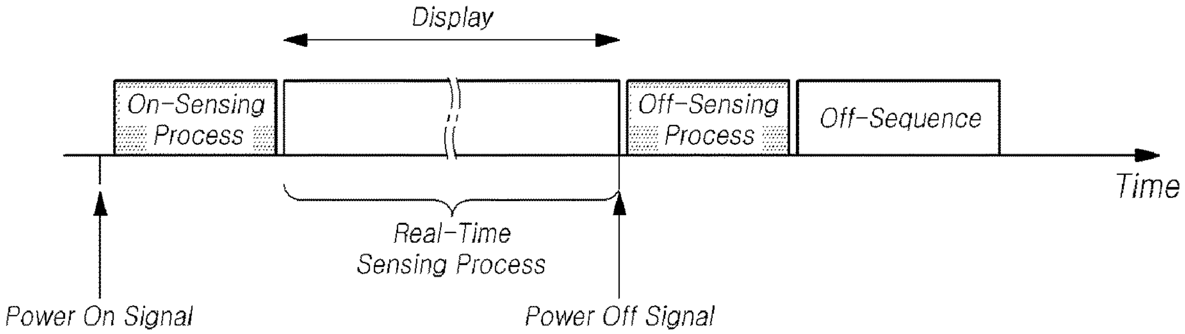
FIG. 5 is a diagram illustrating various sensing timings of a display device in accordance with embodiments of the present disclosure.
Figure 6:
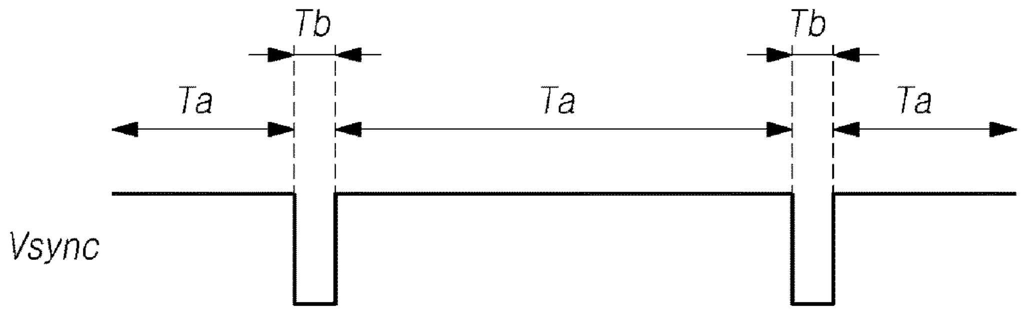
FIG. 6 is a diagram illustrating a vertical synchronization signal of a display device in accordance with embodiments of the present disclosure.

FIG. 5 is a diagram illustrating various sensing timings of a display device 100 in accordance with embodiments of the present disclosure, and FIG. 6 is a diagram illustrating a vertical synchronization signal Vsync of a display device 100 in accordance with embodiments of the present disclosure.

Referring to FIG. 5, when a power on signal is generated, the display device 100 in accordance with the embodiments of the present disclosure may sense the characteristic value of the driving transistor DRT in each subpixel SP disposed in the display panel 110. Such a sensing process is referred to as an "on-sensing process."

In addition, when a power off signal is generated, before an off-sequence such as a power-off proceeds, the characteristic value of the driving transistor DRT in each subpixel SP disposed in the display panel 110 may be sensed. Such a sensing process is referred to as an "off-sensing process."

Also, before the power-off signal is generated after the power-on signal is generated, during a display driving, the characteristic value of the driving transistor DRT in each subpixel SP may be sensed. Such a sensing process is referred to as a "real-time sensing process."

Referring to FIG. 6, the vertical synchronization signal Vsync as a control signal for defining a frame may repeatedly include a signal period that defines an active time period Ta and a signal period that defines a blank time period Tb. The active time period Ta may be a time period during which an actual display driving for updating an image is performed, and the blank time period Tb may be an idle time period during which an actual display driving is not performed.

For example, the signal period that defines the active time period Ta may be a high level voltage period, and the signal period that defines the blank time period Tb may be a low level voltage period. For another example, the signal period that defines the active time period Ta may be a low level voltage period, and the signal period that defines the blank time period Tb may be a high level voltage period.

Referring to FIG. 6, one frame time period may include one active time period Ta and one blank time period Tb.

The aforementioned real-time sensing process may be performed during each blank time period Tb between active time period Ta on the basis of the vertical synchronization signal Vsync.

Since a sensing of the mobility of the driving transistor DRT requires only a short time, the sensing of the mobility of the driving transistor DRT may be performed in the F-mode for a short time.

Therefore, the sensing of the mobility of the driving transistor DRT may be performed as the on-sensing process before a display driving starts when the power-on signal is generated, may be performed as the off-sensing process during a period in which a display driving is not performed when the power-off signal is generated, or may be performed as the real-time sensing process for each short blank time period during a display driving.

In contrast, a sensing of the threshold voltage Vth of the driving transistor DRT requires the long voltage saturation time period Vsat of the second node N2 of the driving transistor DRT. Accordingly, the sensing of the threshold voltage of the driving transistor DRT may be performed in the S-mode for a relatively long time.

Thus, the sensing of the threshold voltage of the driving transistor DRT should be performed by utilizing a time period that does not interfere with a user's watching. Accordingly, the sensing of the threshold voltage of the driving transistor DRT may be performed after the power off signal is generated according to a user input or the like and while a display driving is not performed (i.e., the user does not have a watching intention). That is to say, the sensing of the threshold voltage of the driving transistor DRT may be performed as the off-sensing process, and sensed threshold voltage-related information may be stored in a memory.

However, the threshold voltage Vth of the driving transistor DRT may vary even during a display driving. Therefore, when the sensing of the threshold voltage of the driving transistor DRT is performed as the off-sensing process to compensate the threshold voltage, the threshold voltage Vth varied during the display driving may not be reflected. Due to this fact, there is a problem in that an image quality degradation may occur.

In order to solve the problem of the image quality degradation, embodiments of the present disclosure suggest a display device 100 and a driving method, capable of improving the accuracy of threshold voltage compensation by calculating a threshold voltage compensation value during a display driving. This will be described below in detail.

Figure 7:
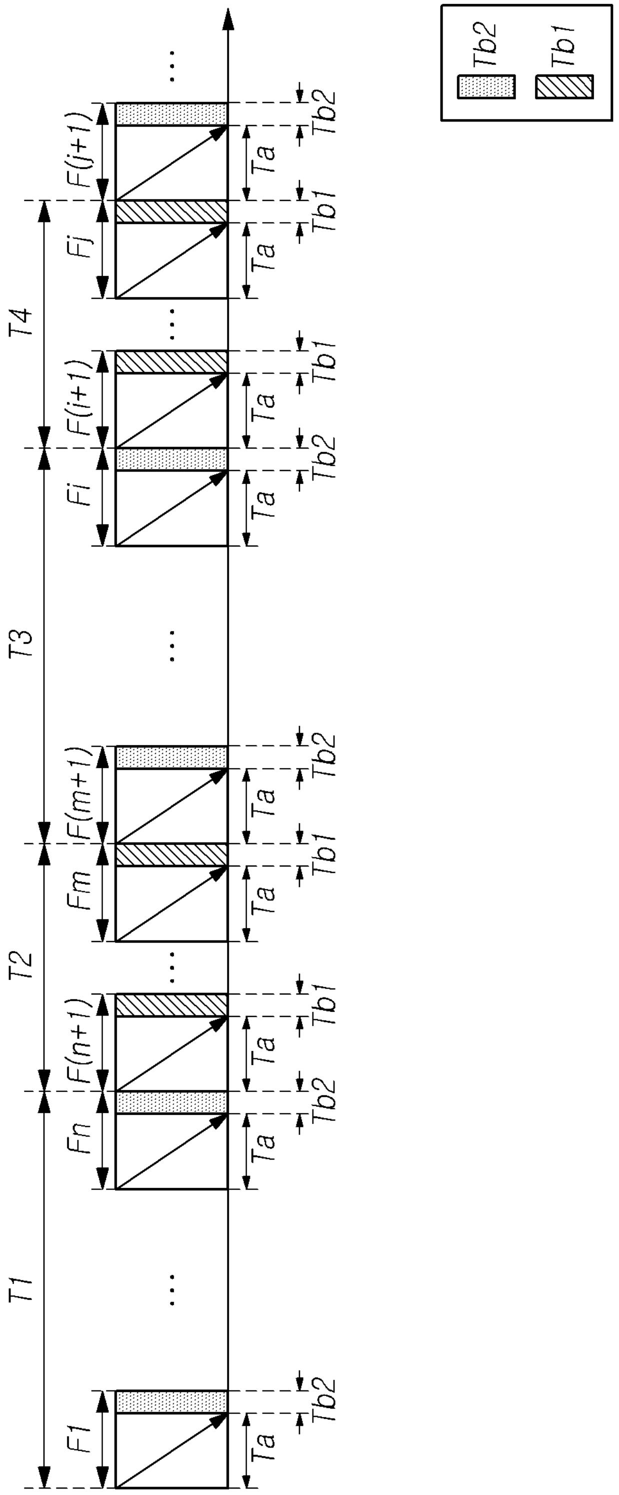
FIG. 7 is a diagram illustrating the driving timing of a display device in accordance with embodiments of the present disclosure.

FIG. 7 is a diagram illustrating the driving timing of a display device 100 in accordance with embodiments of the present disclosure.

The driving time period of the display device 100 may include a first driving time period T1, a second driving time period T2, a third driving time period T3, and a fourth driving time period T4.

The first driving time period T1 includes at least one frame time period including a blank time period Tb2 in which mobility sensing is performed. In other words, the first driving time period T1 may include at least one frame time period, and the at least one frame time period included in the first driving time period T1 may include the blank time period Tb2 in which mobility sensing is performed. The first driving time period T1 may be a second type sensing time period.

Frame time period each including the blank time period Tb2 in which mobility sensing is performed may include a first frame time period F1 to an nth frame time period Fn.

Each of the first frame time period F1 to the nth frame time period Fn may include an active time period Ta and the blank time period Tb2.

In the blank time period Tb2 of each of the first frame time period F1 to the nth frame time period Fn, sensing of the mobility of the driving transistor DRT may be performed. For example, it may be assumed that the plurality of gate lines GL include 2160 gate lines. In addition, it may be assumed that one pixel is composed of WRGB subpixels SP of four colors. In this case, second type sensing may be performed on subpixels SP of a specific color connected to a first gate line GL1 during a first frame time period F1. The second type sensing may be performed on subpixels SP of a specific color connected to a second gate line GL2 during a second frame time period F2. The second type sensing may be repeatedly performed. The second type sensing may be performed on subpixels SP of a specific color connected to a $2160^{th}$ gate line GL2160 during a $2160^{th}$ frame time period F2160. Thereafter, the second type sensing may be performed on subpixels SP of a specific color connected to the first gate line GL1 during a $2161^{st}$ frame time period F2161. Namely, the first driving time period T1 may proceed as 2160 frame time period are repeated. For example, when 2160 frame time period are repeated 10 times, n of the nth frame time period Fn may be 21600. The above-described numerical values are nothing but a mere example for explanation, and do not limit embodiments of the present disclosure.

The second driving time period T2 may include at least one frame time period including a blank time period Tb1 for detecting a negative variation of a threshold voltage, and may be a time period after the first driving time period T1. The second driving time period T2 may include at least one frame time period, and the at least one frame time period included in the second driving time period T2 may include the blank time period Tb1 for detecting a negative variation of a threshold voltage. The second driving time period T2 may be a first type sensing time period.

Frame time period each including the blank time period Tb1 for detecting a negative variation of a threshold voltage may include an (n+1)th frame time period F(n+1) to an mth frame time period Fm.

Each of the (n+1)th frame time period F(n+1) to the mth frame time period Fm may include an active time period Ta and the blank time period Tb1.

In the blank time period Tb1 of each of the (n+1)th frame time period F(n+1) to the mth frame time period Fm, sensing for detecting a negative variation of a threshold voltage may be performed. For example, it may be assumed that the plurality of gate lines GL include 2160 gate lines. In addition, it may be assumed that one pixel is composed of WRGB subpixels SP of four colors. In this case, first type sensing may be performed on subpixels SP of a specific color connected to a first gate line GL1 during an (n+1)th frame time period F(n+1). The first type sensing may be performed on subpixels SP of a specific color connected to a second gate line GL2 during an (n+2)th frame time period F(n+2). The first type sensing may be repeatedly performed. The first type sensing may be performed on subpixels SP of a specific color connected to a $2160^{th}$ gate line GL2160 during an mth frame time period Fm. That is to say, since the first type sensing is performed in each blank time period Tb1 of the second driving time period T2, on the premise of the above assumption, the number of the (n+1)th frame time period F(n+1) to the mth frame time period Fm may be 2160*4=8640. When assuming that a frame time period during which the first type sensing is performed is 8.3 ms, the second driving time period T2 may proceed for about 72 seconds by being calculated as "2160*4*8.3 ms." The above-described numerical values are nothing but a mere example, and do not limit embodiments of the present disclosure.

The third driving time period T3 includes at least one frame time period including the blank time period Tb2 in which mobility sensing is performed. In other words, the third driving time period T3 may include at least one frame time period, and the at least one frame time period included in the third driving time period T3 may include the blank time period Tb2 in which mobility sensing is performed. The third driving time period T3 may be a second type sensing time period.

Frame time period each including the blank time period Tb2 in which mobility sensing is performed may include an (m+1)th frame time period F(m+1) to an ith frame time period Fi.

Each of the (m+1)th frame time period F(m+1) to the ith frame time period Fi may include an active time period Ta and the blank time period Tb2.

In the blank time period Tb2 of each of the (m+1)th frame time period F(m+1) to the ith frame time period Fi, sensing of the mobility of the driving transistor DRT may be performed.

The fourth driving time period T4 may include frame time period each including the blank time period Tb1 for detecting a negative variation of a threshold voltage, and may be a time period after the third driving time period T3.

The fourth driving time period T4 may include at least one frame time period including the blank time period Tb1 for detecting a negative variation of a threshold voltage, and may be a time period after the third driving time period T3. The fourth driving time period T4 may include at least one frame time period, and the at least one frame time period included in the fourth driving time period T4 may include the blank time period Tb1 for detecting a negative variation of a threshold voltage. The fourth driving time period T4 may be a first type sensing time period.

Frame time period each including the blank time period Tb1 for detecting a negative variation of a threshold voltage may include an (i+1)th frame time period F(i+1) to a jth frame time period Fj.

Each of the (i+1)th frame time period F(i+1) to the jth frame time period Fj may include an active time period Ta and the blank time period Tb1.

In the blank time period Tb1 of each of the (i+1)th frame time period F(i+1) to the jth frame time period Fj, sensing for detecting a negative variation of a threshold voltage may be performed.

The second driving time period T2 may be a time period different from the first driving time period T1. The first driving time period T1 and the second driving time period T2 may be time period that are continuous in time, or another time period may exist between the first driving time period T1 and the second driving time period T2.

For example, the second driving time period T2 may be a time period after the first driving time period T1. After the first driving time period T1 proceeds, the second driving time period T2 may proceed immediately thereafter. Unlike this, after the first driving time period T1 proceeds, another driving time period may proceed and thereafter the second driving time period T2 may proceed.

The above-described relationship between the second driving time period T2 and the first driving time period T1 is the same as the relationship between the third driving time period T3 and the second driving time period T2 and the relationship between the fourth driving time period T4 and the third driving time period T3.

Meanwhile, in the blank time period Tb1 included in the second driving time period T2 and the fourth driving time period T4, sensing for detecting a negative variation of a threshold voltage is performed, and a sensing time period for detecting a negative variation of a threshold voltage proceeded in the blank time period Tb1 may be a first type sensing time period.

In the blank time period Tb2 included in the first driving time period T1 and the third driving time period T3, sensing of the mobility of the driving transistor DRT is performed, and a sensing time period for sensing the mobility of the driving transistor DRT proceeded in the blank time period Tb2 may be a second type sensing time period.

A driving time period including the first type sensing time period and a driving time period including the second type sensing time period may alternately proceed. For example, the first driving time period T1 including the second type sensing time period, the second driving time period T2 including the first type sensing time period, the third driving time period T3 including the second type sensing time period and the fourth driving time period T4 including the first type sensing time period may proceed in that order.

The first driving time period T1 and the third driving time period T3 may proceed for a longer time than the second driving time period T2 and the fourth driving time period T4.

While the display device 100 is driven, the threshold voltage and mobility of the driving transistor DRT may vary due to degradation, etc., of the driving transistor DRT. Even if the variation occurs, when the degree of variation is low, the problem of degradation of the image quality of the display device 100 may be slight. However, when a negative variation of a threshold voltage increases or a variation in mobility increases, a luminance to which a subpixel emits light may become different from an originally intended luminance. Therefore, it is necessary to compensate for a negative variation of a threshold voltage through sensing of the negative variation of the threshold voltage, and also, it is necessary to compensate for a variation in mobility through sensing of a mobility.

A sensing time period for detecting a negative variation of a threshold voltage proceeds during the blank time period Tb1, and a sensing time period for sensing a mobility of the driving transistor DRT proceeds during the blank time period Tb2. Namely, the real-time sensing process performed when the display device 100 is driven cannot help but be performed during the limited blank time period Tb. Therefore, of a sensing time period for detecting a negative variation of a threshold voltage and a sensing time period for sensing a mobility of the driving transistor DRT, a sensing time period of sensing to be frequently performed needs to proceed more frequently.

When the display device 100 is driven for the same time, a variation in mobility may be greater than a negative variation of a threshold voltage. That is to say, sensing of a mobility needs to be performed more frequently than sensing of a negative variation of a threshold voltage.

Accordingly, when comparing the first driving time period T1 and the third driving time period T3 including the blank time period Tb2 in which sensing of a mobility is performed and the second driving time period T2 and the fourth driving time period T4 including the blank time period Tb1 in which sensing of a negative variation of a threshold voltage is performed, the first driving time period T1 and the third driving time period T3 may proceed for a longer time than the second driving time period T2 and the fourth driving time period T4.

As sensing of a mobility is performed more frequently, a luminance expressed by the display panel 110 may be accurately improved. Therefore, as the first driving time period T1 and the third driving time period T3 proceed for a longer time than the second driving time period T2 and the fourth driving time period T4, a luminance expressed by the display panel 110 may be more accurately improved.

However, since a negative variation of a threshold voltage also needs to be sensed, the first driving time period T1 and the third driving time period T3 cannot be driven for an unlimitedly long time when compared to the second driving time period T2 and the fourth driving time period T4.

For example, when the display device 100 is driven for about 2 hours, a negative variation may occur in the threshold voltage of the driving transistor DRT to an extent that affects a luminance. However, since the characteristic of the driving transistor DRT may vary depending on the material, process deviation, driving environment, etc., of a transistor element, the aforementioned 2 hours is nothing but a mere example. In other words, when the display device 100 is driven for shorter than 2 hours or longer than 2 hours, a negative variation may proceed in the threshold voltage of the transistor DRT to an extent that affects a luminance.

As in the aforementioned example, when the first driving time period T1 or the third driving time period T3 proceeds for 2 hours, a negative variation may occur in the threshold voltage of the driving transistor DRT to an extent that affects a luminance, and thus, sensing of a negative variation of a threshold voltage needs to be performed.

Sensing of a negative variation of a threshold voltage may be performed during the blank time period Tb, and may be performed during the blank time period Tb1 included in the second driving time period T2 and the fourth driving time period T4.

Since sensing of a mobility needs to be performed more frequently than sensing of a negative variation of a threshold voltage, as the second driving time period T2 and the fourth driving time period T4 in which sensing of a negative variation of a threshold voltage is performed proceed for a shortest time as possible, a luminance expressed by the display panel 110 may be more accurately improved.

For example, it may be assumed that the plurality of gate lines GL include 2160 gate lines, one pixel is composed of WRGB subpixels SP of four colors and a frame time period during which sensing of a negative variation of a threshold voltage is performed is 8.3 ms. In this case, sensing of a negative variation of a threshold voltage may be repeatedly performed for each gate line GL, and may be performed separately for the color of each subpixel. Therefore, the second driving time period T2 and the fourth driving time period T4 that proceed for a short time may proceed for about 72 seconds by being calculated as "2160 being the number of the gate lines GL*4 being the number of different colors of each subpixel*8.3 ms being a time period during which a frame time period proceeds. However, this is nothing but a mere example.

Namely, after a driving time period including the first type sensing time period for sensing a negative variation of a threshold voltage for a short time proceeds, a driving time period including the second type sensing time period for sensing a mobility may proceed.

The foregoing may be summarized as follows. When the first driving time period T1 and the third driving time period T3 proceed for a long time, only sensing of the mobility of the driving transistor DRT, as the second type sensing, may be performed during the blank time period Tb2 included in the first driving time period T1 and the third driving time period T3. In this case, a problem may arise in that the threshold voltage of the driving transistor DRT negatively shifts.

In order to compensate for the negatively shifted threshold voltage, sensing for detecting a negative variation of a threshold voltage, as the first type sensing, may be performed during the second driving time period T2 and the fourth driving time period T4.

By compensating for a negatively shifted threshold voltage on the basis of a sensing value obtained during the first type sensing time period, a deviation in luminance between subpixels SP may be reduced, and thereby, the problem of nonuniform luminance may be solved.

Hereinafter, the second type sensing time period included in the first driving time period T1 and the first type sensing time period included in the second driving time period T2 will be described in detail.

Figure 8:
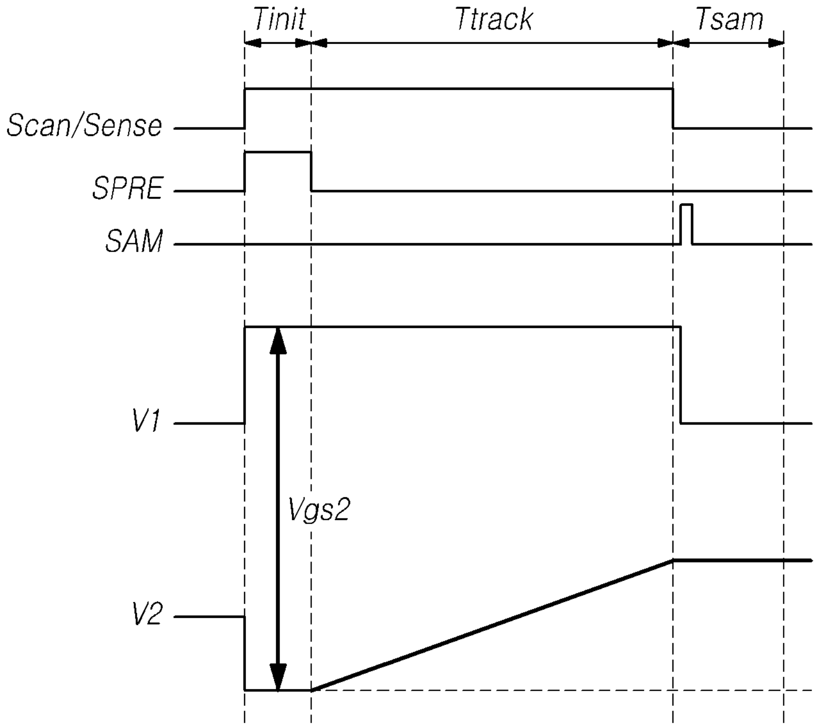
FIGS. 8 and 9 are driving timing diagrams for sensing driving transistor characteristic value proceeded in a blank time period included in a first driving time period of a display device in accordance with embodiments of the present disclosure.
Figure 9:
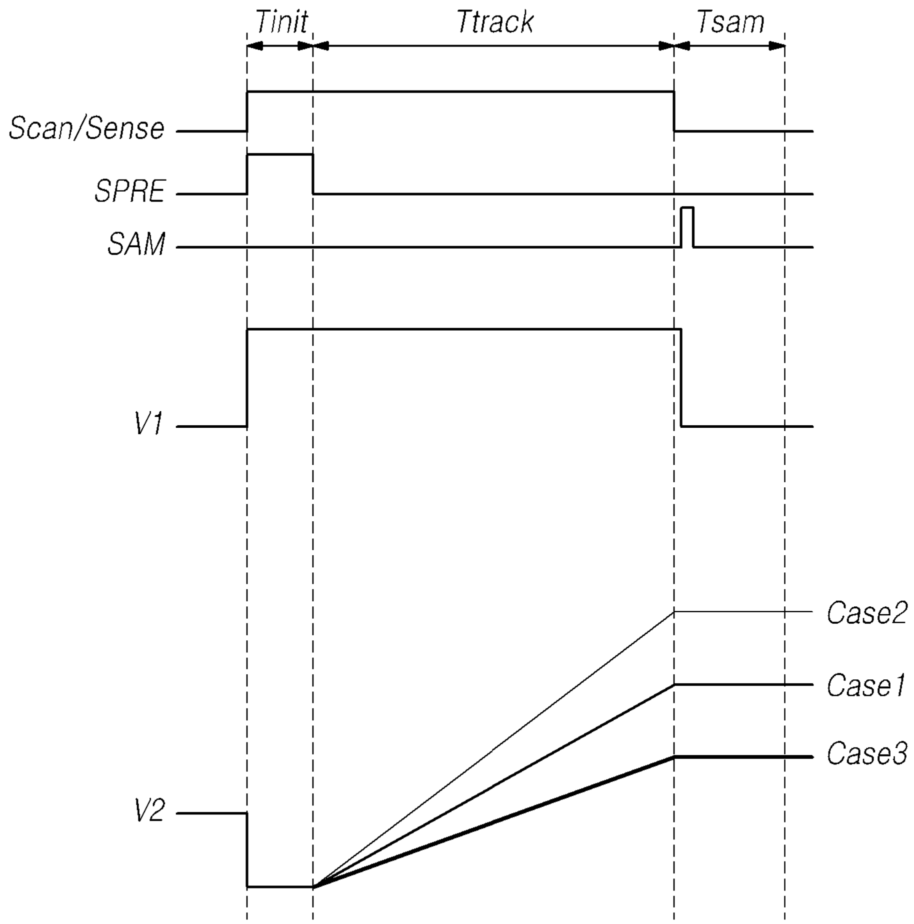

FIGS. 8 and 9 are driving timing diagrams for sensing characteristic values of driving transistors DRT proceeded in a blank time period Tb included in a first driving time period T1 of a display device 100 in accordance with embodiments of the present disclosure.

Referring to FIG. 8, sensing of the characteristic value of the driving transistor DRT performed during the blank time period Tb2 included in the first driving time period T1 may be the second type sensing.

The second type sensing time period includes an initialization time period Tinit, a tracking time period Ttrack and a sampling time period Tsam.

The initialization time period Tinit is a time period for initializing the first node N1 and the second node N2 of the driving transistor DRT. During the initialization time period Tinit, the scan transistor SCT and the sensing transistor SENT may be turned on, and the power switch SPRE may be turned on.

During the initialization time period Tinit, a voltage V1 of the first node N1 of the driving transistor DRT is initialized to the sensing driving data voltage Vdata_SEN, and a voltage V2 of the second node N2 of the driving transistor DRT is initialized to the sensing driving reference voltage Vref.

A voltage difference Vgs2 between the voltage V1 of the first node N1 of the driving transistor DRT and the voltage V2 of the second node N2 of the driving transistor DRT may have a voltage which does not correspond to the threshold voltage Vth of the corresponding driving transistor DRT identified from the threshold voltage-related information stored in the memory.

The tracking time period Ttrack is a time period for boosting the voltage V2 of the second node N2 of the driving transistor DRT until the voltage V2 of the second node N2 of the driving transistor DRT reflects the characteristic value or a variation in characteristic value of the driving transistor DRT.

During the tracking time period Ttrack, as the power switch SPRE is turned off, the second node N2 of the driving transistor DRT is floated. Accordingly, the first node N1 of the driving transistor DRT is in a constant voltage state having the sensing driving data voltage Vdata_SEN, but the voltage V2 of the second node N2 of the driving transistor DRT may rise.

During the tracking time period Ttrack, a speed at which the voltage V2 of the second node N2 of the driving transistor DRT rises may correspond to the mobility of the driving transistor DRT.

After the tracking time period Ttrack, the sampling time period Tsam may begin.

During the sampling time period Tsam, the scan transistor SCT, the sensing transistor SENT and the power switch SPRE are turned off. Thereafter, when the sampling switch SAM is turned on, as the analog-to-digital converter ADC and the reference voltage line RVL are electrically connected, the analog-to-digital converter ADC senses the voltage of the reference voltage line RVL.

Referring to FIG. 9, during the tracking time period Ttrack, a degree to which the voltage V2 of the second node N2 of the driving transistor DRT rises may be different in each driving transistor DRT.

Case 1 shows a variation in the voltage V2 of the second node N2 of the driving transistor DRT with no variation in mobility characteristic, Case 2 shows a variation in the voltage V2 of the second node N2 of the driving transistor DRT whose mobility characteristic relatively increases compared to the driving transistor DRT of Case 1, and Case 3 shows a variation in the voltage V2 of the second node N2 of the driving transistor DRT whose mobility characteristic relatively decreases compared to the driving transistor DRT of Case 1.

When observing the variation in the voltage V2 of the second node N2 of the driving transistor DRT whose mobility characteristic relatively increases compared to the variation in the voltage V2 of the second node N2 of the driving transistor DRT with no variation in mobility characteristic, the voltage V2 of the second node N2 of the driving transistor DRT whose mobility characteristic increases has a relatively fast rising speed during the tracking time period Ttrack, and has a relatively high voltage magnitude during the sampling time period Tsam.

When observing the variation in the voltage V2 of the second node N2 of the driving transistor DRT whose mobility characteristic relatively decreases compared to the variation in the voltage V2 of the second node N2 of the driving transistor DRT with no variation in mobility characteristic, the voltage V2 of the second node N2 of the driving transistor DRT whose mobility characteristic decreases has a relatively slow rising speed during the tracking time period Ttrack, and has a relatively low voltage magnitude during the sampling time period Tsam.

Figure 10:
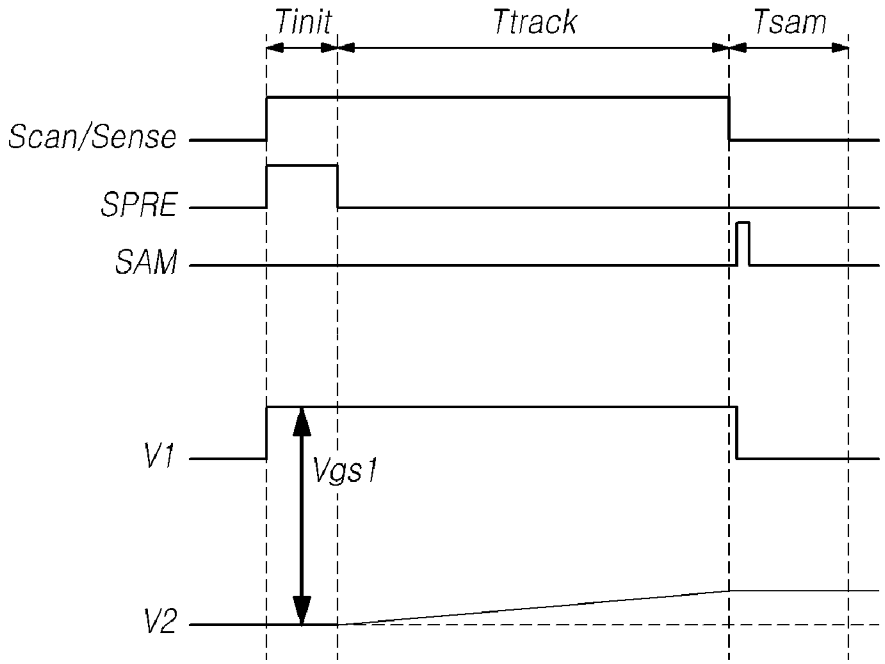
FIGS. 10 and 11 are driving timing diagrams for sensing driving transistor characteristic value proceeded in a blank time period included in a second driving time period of a display device in accordance with embodiments of the present disclosure.
Figure 11:
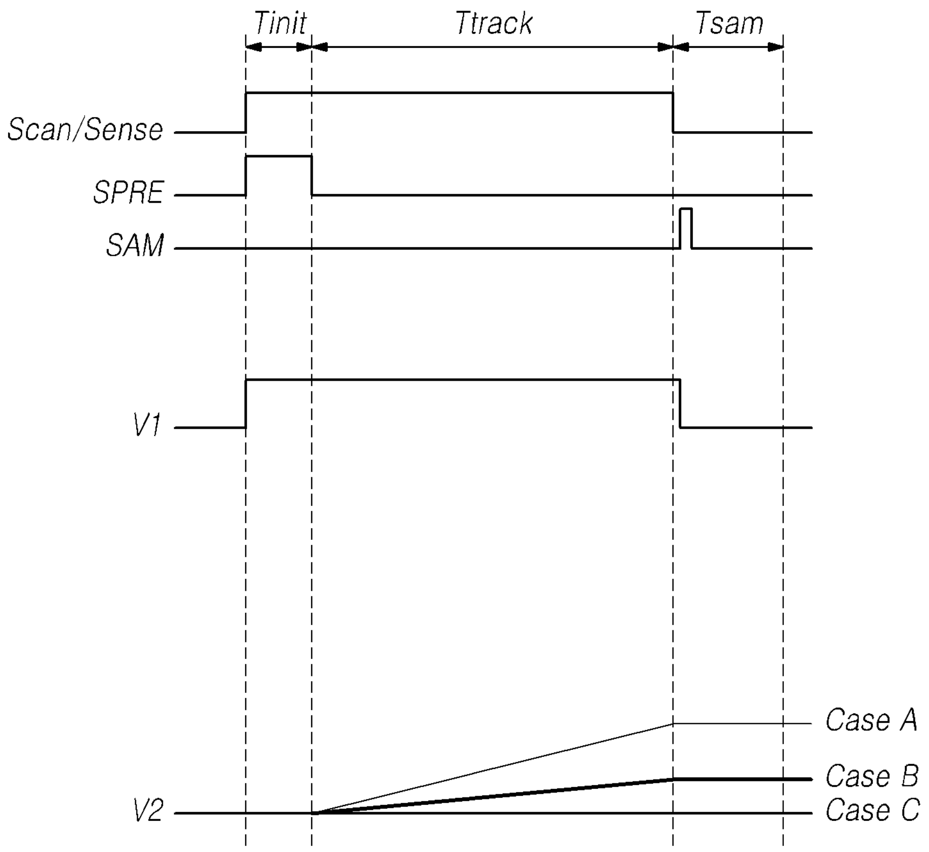

FIGS. 10 and 11 are driving timing diagrams for sensing characteristic values of driving transistors DRT proceeded in a blank time period Tb included in a second driving time period T2 of a display device 100 in accordance with embodiments of the present disclosure.

Referring to FIG. 10, sensing of the characteristic value of the driving transistor DRT performed during the blank time period Tb1 included in the second driving time period T2 may be the first type sensing.

The first type sensing time period includes an initialization time period Tinit, a tracking time period Ttrack and a sampling time period Tsam.

The initialization time period Tinit is a time period for initializing the first node N1 and the second node N2 of the driving transistor DRT. During the initialization time period Tinit, the scan transistor SCT and the sensing transistor SENT may be turned on, and the power switch SPRE may be turned on.

During the initialization time period Tinit, a voltage V1 of the first node N1 of the driving transistor DRT is initialized to the sensing driving data voltage Vdata_SEN, and a voltage V2 of the second node N2 of the driving transistor DRT is initialized to the sensing driving reference voltage Vref.

A voltage difference Vgs1 between the voltage V1 of the first node N1 of the driving transistor DRT and the voltage V2 of the second node N2 of the driving transistor DRT may be set to correspond to the threshold voltage Vth of the corresponding driving transistor DRT identified from the threshold voltage-related information stored in the memory.

Before the first type sensing time period proceeds, a threshold voltage sensing time period for sensing the threshold voltage Vth of the driving transistor DRT may proceed. As the threshold voltage sensing time period proceeds, the threshold voltage-related information stored in the memory may be stored or updated.

After the initialization time period Tinit, the tracking time period Ttrack may proceed. During the tracking time period Ttrack, as the power switch SPRE is turned off, the second node N2 of the driving transistor DRT is floated.

Referring to FIG. 11, after the second node N2 is floated, the voltage V2 of the second node N2 of the driving transistor DRT may rise or not rise depending on the shift state of the threshold voltage of the driving transistor DRT.

Referring to Case A and Case B of FIG. 11, during the first type sensing time period, in the case of a state in which the threshold voltages of driving transistors DRT included in some subpixels SP are negatively shifted, the voltage V2 of the second node N2 of the driving transistor DRT may rise during the tracking time period Ttrack.

That is to say, during the first type sensing time period, the threshold voltages of the driving transistors DRT included in some subpixels SP may have voltage values lower than the threshold voltages of the driving transistors DRT during the threshold voltage sensing time period before the first type sensing time period.

Referring to Case C of FIG. 11, during the first type sensing time period, in the case of a state in which the threshold voltages of driving transistors DRT included in some subpixels SP are not shifted or are positively shifted, the voltage V2 of the second node N2 of the driving transistor DRT may not vary or vary within a selected (or predetermined) level during the tracking time period Ttrack.

In other words, during the first type sensing time period, the threshold voltages of the driving transistors DRT included in some subpixels SP may have voltage values the same as or greater than the threshold voltages of the driving transistors DRT during the threshold voltage sensing time period before the first type sensing time period.

After the tracking time period Ttrack, the sampling time period Tsam may begin.

During the sampling time period Tsam, the scan transistor SCT, the sensing transistor SENT and the power switch SPRE are turned off. Thereafter, when the sampling switch SAM is turned on, as the analog-to-digital converter ADC and the reference voltage line RVL are electrically connected, the analog-to-digital converter ADC senses the voltage of the reference voltage line RVL.

Referring to FIG. 11, during the tracking time period Ttrack, the rising speed or rising slope of the voltage V2 of the second node N2 of the driving transistor DRT may be different in each driving transistor DRT.

Referring to Case A and Case B of FIG. 11, during the first type sensing time period, in the case of a state in which the threshold voltages of driving transistors DRT included in some subpixels SP are negatively shifted, the voltage V2 of the second node N2 of the driving transistor DRT may rise during the tracking time period Ttrack.

When comparing a driving transistor of Case A whose threshold voltage is relatively strongly negative-shifted and a driving transistor of Case B whose threshold voltage is relatively weakly negative-shifted, the voltage V2 of the second node N2 of the driving transistor DRT whose threshold voltage is relatively strongly negative-shifted has a relatively fast rising speed during the tracking time period Ttrack and has a relatively high voltage magnitude during the sampling time period Tsam.

Referring to Case C of FIG. 11, during the first type sensing time period, in the case of a state in which the threshold voltages of driving transistors DRT included in some subpixels SP are not shifted or are positively shifted, the voltage V2 of the second node N2 of the driving transistor DRT may not vary or vary within a selected (or predetermined) level during the tracking time period Ttrack.

Referring to FIGS. 7 and 11, the first type sensing time period may proceed in the plurality of blank time period Tb1 included in the second driving time period T2 and the fourth driving time period T4.

During a first blank time period Tb1 included in the plurality of blank time period Tb1 included in the second driving time period T2, after the voltage difference between the first node N1 and the second node N2 of the driving transistor DRT included in a first subpixel SP1 is initialized to a first initial control value Vgs1_1, the voltage V2 of the second node N2 of the driving transistor DRT included in the first subpixel SP1 may rise. The driving transistor DRT in which the voltage V2 of the second node N2 rises may have a threshold voltage lower than a threshold voltage before the first blank time period Tb1. Namely, the threshold voltage of the driving transistor DRT included in the first subpixel SP1 may be in a negatively shifted state.

During a blank time period Tb1 after the first blank time period Tb1 included in the second driving time period T2, after the voltage difference between the first node N1 and the second node N2 of the driving transistor DRT included in a second subpixel SP2 is initialized to a second initial control value Vgs1_2, the voltage V2 of the second node N2 of the driving transistor DRT included in the second subpixel SP2 may not rise. The driving transistor DRT in which the voltage V2 of the second node N2 does not rise may have a threshold voltage the same as or greater compared to a threshold voltage before the corresponding blank time period Tb1. That is to say, the threshold voltage of the driving transistor DRT included in the second subpixel SP2 may be in an unshifted state or a positively shifted state.

Referring to FIG. 10, the voltage difference Vgs1 between the voltage V1 of the first node N1 of the driving transistor DRT included in an arbitrary subpixel SP and the voltage V2 of the second node N2 of the driving transistor DRT may be checked. The magnitude of the voltage difference Vgs1 may vary depending on the characteristic value of the subpixel SP.

For example, referring to FIG. 10, the first initial control value Vgs1_1 as a voltage difference between the first node N1 and the second node N2 of the driving transistor DRT included in the aforementioned first subpixel SP1 may be the voltage difference Vgs1 between the voltage V1 of the first node N1 of the driving transistor DRT and the voltage V2 of the second node N2 of the driving transistor DRT.

For example, referring to FIG. 10, the second initial control value Vgs1_2 as a voltage difference between the first node N1 and the second node N2 of the driving transistor DRT included in the second subpixel SP2 may be the voltage difference Vgs1 between the voltage V1 of the first node N1 of the driving transistor DRT and the voltage V2 of the second node N2 of the driving transistor DRT.

Referring to FIGS. 8 and 10, the characteristics of the first type sensing time period and the characteristics of the second type sensing time period have the following differences.

The blank time period Tb1 during which the first type sensing time period proceeds may be different from the blank time period Tb2 during which the second type sensing time period proceeds. After the blank time period Tb1 during which the first type sensing time period proceeds, the blank time period Tb2 during which the second type sensing time period proceeds may proceed.

During the blank time period Tb1 during which the first type sensing time period proceeds, the voltage difference Vgs1 between the first node N1 and the second node N2 of the driving transistor DRT included in the first subpixel SP1 may be initialized to the first control value Vgs1, and thereafter, the voltage of the second node N2 may rise.

During the blank time period Tb2 during which the second type sensing time period proceeds, the voltage difference Vgs2 between the first node N1 and the second node N2 of the driving transistor DRT included in the second subpixel SP2 may be initialized to the second control value Vgs2, and thereafter, the voltage of the second node N2 may rise.

The second control value Vgs2, as the voltage difference Vgs2 between the first node N1 and the second node N2 of the driving transistor DRT included in the second subpixel SP2, may be set to be different from the first control value Vgs1, as the voltage difference Vgs1 between the first node N1 and the second node N2 of the driving transistor DRT included in the first subpixel SP1.

The first control value Vgs1 may be set to correspond to the threshold voltage Vth of the corresponding driving transistor DRT identified from the threshold voltage-related information stored in the memory, and the second control value Vgs2 may have a voltage which does not correspond to the threshold voltage Vth of the corresponding driving transistor DRT identified from the threshold voltage-related information stored in the memory.

When the voltage V2 of the second node N2 of the driving transistor DRT included in the first subpixel SP1 rises during the tracking time period Ttrack of the first type sensing time period, the driving transistor DRT included in the first subpixel SP1 may have a threshold voltage which is lowered compared to a threshold voltage before the blank time period.

During the tracking time period Ttrack of the second type sensing time period, the voltage rising speed of the first node N1 of the driving transistor DRT included in the second subpixel SP2 may correspond to the mobility of the driving transistor DRT.

Figure 12:
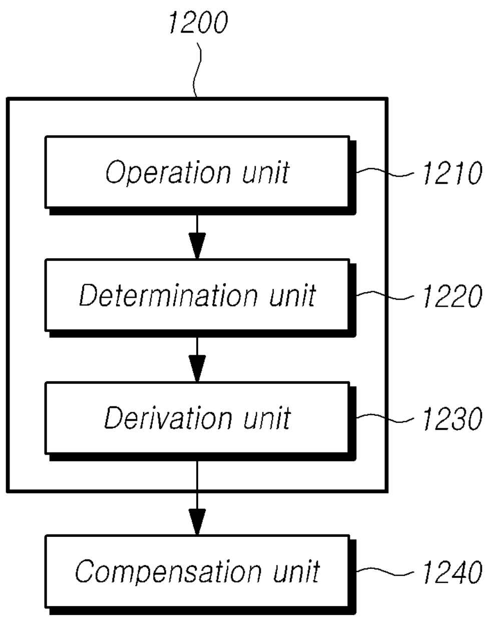
FIG. 12 is a diagram illustrating the configuration of a threshold voltage sensing circuit in accordance with embodiments of the present disclosure.

FIG. 12 is a diagram illustrating the configuration of a threshold voltage sensing circuit 1200 in accordance with embodiments of the present disclosure.

The threshold voltage sensing circuit 1200 included in the display device 100 may include an operation circuit 1210 which generates operation data SEN on the basis of sensing data Data_sen sensed during the first type sensing time period and reference data Data_ref, a determination circuit 1220 which compares the operation data SEN and a selected (or predetermined) operation data range to determine whether a subpixel SP includes a driving transistor DRT whose negative voltage is negatively shifted, and a derivation circuit 1230 which derives a threshold voltage variation value of a subpixel SP whose threshold voltage varies, on the basis of the operation data SEN.

The threshold voltage sensing circuit 1200 may be included inside the controller 140, but may be disposed as a separate component from the controller 140.

A voltage sensed during the sampling time period Tsam included in the first type sensing time period may be converted into the sensing data Data_sen by the analog-to-digital converter ADC, and the converted sensing data Data_sen may be transmitted to the operation circuit 1210.

The operation circuit 1210 may generate the operation data SEN by performing operation processing on the basis of the received sensing data Data_sen and the reference data Data_ref.

After the operation data SEN is obtained through the operation processing, the determination circuit 1220 may compare the operation data SEN and the selected (or predetermined) operation data range, and according to a comparison result, may determine whether a corresponding subpixel SP is a varied subpixel SP. The corresponding subpixel SP may be a subpixel in which sensing has been performed. Through the sensing of the corresponding subpixel SP, the voltage of the second node N2 of the driving transistor DRT included in the corresponding subpixel SP may be detected.

If the operation data SEN has a value that is out of the selected (or predetermined) operation data range, the determination circuit 1220 may determine that the corresponding subpixel SP is a varied subpixel SP. If the operation data SEN is a value within the selected (or predetermined) operation data range, the determination circuit 1220 may determine that the corresponding subpixel SP is not a varied subpixel SP.

The derivation circuit 1230 may derive a threshold voltage variation value of the driving transistor DRT whose threshold voltage is negatively shifted, on the basis of the operation data SEN.

The compensation circuit 1240 may correct threshold voltage-related information sensed during the threshold voltage sensing time period proceeded before the first type sensing time period and stored in the memory, on the basis of the threshold voltage variation value, may compensate the image data Data on the basis of the corrected threshold voltage-related information, and may store the corrected threshold voltage-related information in the memory after compensation.

The compensation circuit 1240 may be included inside the controller 140, and as the case may be, may be included outside the controller 140.

Figure 13:
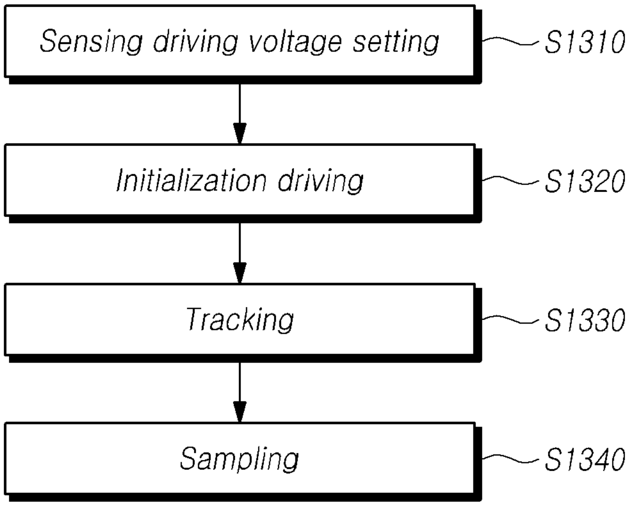
FIG. 13 is a flowchart showing a first type sensing time period of a display device in accordance with embodiments of the present disclosure.

FIG. 13 is a flowchart showing a first type sensing time period of a display device 100 in accordance with embodiments of the present disclosure.

The first type sensing time period may include first step S1310 of setting the sensing driving voltage of the driving transistor DRT, second step S1320 of initializing the voltages of the first node N1 and the second node N2 of the driving transistor DRT, third step S1330 of tracking a variation in the voltage V2 of the second node N2 of the driving transistor DRT, and fourth step S1340 of sensing and sampling the voltage V2 of the second node N2 of the driving transistor DRT.

The first step S1310 may be step of setting the voltage value of at least one of the sensing driving data voltage Vdata_SEN and the sensing driving reference voltage Vref.

In the first step S1310, the voltage value of at least one of the sensing driving data voltage Vdata_SEN and the sensing driving reference voltage Vref may be set so that the difference between the sensing driving data voltage Vdata_SEN and the sensing driving reference voltage Vref corresponds to the threshold voltage of the driving transistor DRT.

Information on the threshold voltage of the driving transistor DRT may be generated by threshold voltage sensing driving performed before the first step S1310 proceeds, and may be stored in the memory.

The second step S1320 may be step of initializing the first node N1 and the second node N2 of the driving transistor DRT by applying the sensing driving data voltage Vdata_SEN to the first node N1 of the driving transistor DRT and applying the sensing driving reference voltage Vref to the second node N2 of the driving transistor DRT.

The third step S1330 may be step of varying the voltage V2 of the second node N2 of the driving transistor DRT by floating the second node N2 of the driving transistor DRT.

The fourth step S1340 may be step of sampling, after a selected (or predetermined) time period elapses from a time point at which the voltage V2 of the second node N2 of the driving transistor DRT is varied, the voltage V2 of the second node N2 of the driving transistor DRT.

The first step S1310 to the fourth step S1340 included in the first type sensing time period may proceed during the blank time period Tb1 between the active time period Ta.

According to the above-described embodiments of the present disclosure, it is possible to provide a display device and a driving method thereof, capable of compensating for, in real time, variations in threshold voltages of driving transistors during a display driving.

According to the embodiments of the present disclosure, it is possible to provide a display device and a driving method thereof, capable of compensating for, in real time, variations in threshold voltages of driving transistors whose threshold voltages are negatively shifted during a display driving.

According to the embodiments of the present disclosure, it is possible to provide a display device and a driving method thereof, capable of low power consumption by compensating for, in real time, variations in threshold voltages of driving transistors whose threshold voltages are negatively shifted.

A brief description of the embodiments of the present disclosure described above is as follows.

According to embodiments of the present disclosure, it is possible to provide a display device including a plurality of data lines, a plurality of reference voltage lines and a plurality of subpixels connected to the plurality of data lines and the plurality of reference voltage lines, wherein the plurality of data lines include a first data line which is connected to a first subpixel among the plurality of subpixels and the plurality of reference voltage lines include a first reference voltage line which is connected to the first subpixel, wherein the first subpixel includes a first light emitting element, a first driving transistor, a first scan transistor and a first sensing transistor, a first node of the first driving transistor is electrically connectable to the first data line through the first scan transistor and a second node of the first driving transistor is electrically connectable to the first reference voltage line through the first sensing transistor, and wherein, during a first type sensing time period for the first subpixel, a voltage of the second node of the first driving transistor rises, and, before a voltage of the second node of the first driving transistor rises, a voltage difference between a sensing driving data voltage supplied to the first data line and a sensing driving reference voltage supplied to the first reference voltage line is set to correspond to a threshold voltage of the first driving transistor in the first subpixel identified from threshold voltage-related information stored in a memory.

The first type sensing time period may be included in a blank time period between active time periods.

Before the first type sensing time period for the first subpixel proceeds, a threshold voltage sensing time period for sensing a threshold voltage of the first driving transistor may proceed, and as the threshold voltage sensing time period proceeds, the threshold voltage-related information may be stored or updated in the memory.

A threshold voltage of the first driving transistor during the first type sensing time period may have a voltage value lower than a threshold voltage of the first driving transistor during the threshold voltage sensing time period before the first type sensing time period.

During the first type sensing time period for a second subpixel different from the first subpixel, a voltage of a second node of a second driving transistor included in the second subpixel may not vary or vary within a selected (or predetermined) level.

A threshold voltage of the second driving transistor during the first type sensing time period for the second subpixel may have a voltage value the same as or greater than a threshold voltage of the second driving transistor during the threshold voltage sensing time period before the first type sensing time period for the second subpixel.

The display device may further include a data driving circuit which supplies the sensing driving data voltage to the first data line, wherein the data driving circuit may include an analog-to-digital converter for sensing a voltage of the first reference voltage line, a sampling switch which controls connection between the first reference voltage line and the analog-to-digital converter, and an initialization switch which controls connection between a sensing driving reference voltage supply node supplied with the sensing driving reference voltage and the first reference voltage line.

The first type sensing time period proceeds during a first blank time period, a second type sensing time period for a second subpixel proceeds during a second blank time period different from the first blank time period, and, during the second type sensing time period, a voltage of a second node of a second driving transistor included in the second subpixel rises and before a voltage of the second node of the second driving transistor rises, a voltage difference between a sensing driving data voltage supplied to a corresponding data line and a sensing driving reference voltage supplied to a corresponding reference voltage line may not correspond to a threshold voltage of the second driving transistor in the second subpixel identified from the threshold voltage-related information stored in the memory.

During the second type sensing time period, a voltage rising speed of the second node of the second driving transistor may correspond to a mobility of the second driving transistor.

According to embodiments of the present disclosure, it is possible to provide a method for driving a display device, including first step of setting a voltage value of at least one of a sensing driving data voltage and a sensing driving reference voltage, second step of, by applying the sensing driving data voltage to a first node of a driving transistor and applying the sensing driving reference voltage to a second node of the driving transistor, initializing the first node and the second node of the driving transistor, third step of, by floating the second node of the driving transistor, varying a voltage of the second node of the driving transistor, and fourth step of sampling a voltage of the second node of the driving transistor after a selected (or predetermined) time period elapses from a time point at which a voltage of the second node of the driving transistor is varied, wherein, in the first step, a voltage value of at least one of the sensing driving data voltage and the sensing driving reference voltage is set so that a difference between the sensing driving data voltage and the sensing driving reference voltage corresponds to a threshold voltage of the driving transistor.

The first step to the fourth step may be performed during a blank time period between active time periods.

Information on a threshold voltage of the driving transistor may be generated by threshold voltage sensing driving performed before the first step is performed, and may be stored in a memory.

According to embodiments of the present disclosure, it is possible to provide a display device including a first subpixel including a first light emitting element, a first driving transistor, a first scan transistor and a first storage capacitor, and a second subpixel including a second light emitting element, a second driving transistor, a second scan transistor and a second storage capacitor, wherein, during a first blank time period, after a voltage difference between a first node and a second node of the first driving transistor of the first subpixel is initialized to a first control value, a voltage of the second node of the first driving transistor rises, and wherein, during a second blank time period after the first blank time period, after a voltage difference between a first node and a second node of the second driving transistor of the second subpixel is initialized to a second control value, a voltage of the second node of the second driving transistor does not rise.

The first driving transistor may have a threshold voltage lower than a threshold voltage before the first blank time period, and the second driving transistor may have a threshold voltage the same as or greater compared to a threshold voltage before the second blank time period.

According to embodiments of the present disclosure, it is possible to provide a display device including a first subpixel including a first light emitting element, a first driving transistor, a first scan transistor and a first storage capacitor, and a second subpixel including a second light emitting element, a second driving transistor, a second scan transistor and a second storage capacitor, wherein, during a first blank time period, after a voltage difference between a first node and a second node of the first driving transistor of the first subpixel is initialized to a first control value, a voltage of the second node of the first driving transistor rises, and wherein, during a second blank time period after the first blank time period, after a voltage difference between a first node and a second node of the second driving transistor of the second subpixel is initialized to a second control value, a voltage of the second node of the second driving transistor rises and the second control value is set to be different from the first control value.

The first driving transistor may have a threshold voltage lower than a threshold voltage before the first blank time period, and during the second blank time period, a voltage rising speed of the second node of the second driving transistor may correspond to a mobility of the second driving transistor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments described.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a plurality of data lines;

a plurality of reference voltage lines; and a plurality of subpixels electrically connected to the plurality of data lines and the plurality of reference voltage lines, wherein the plurality of data lines includes a first data line which is electrically connected to a first subpixel among the plurality of subpixels, and the plurality of reference voltage lines include a first reference voltage line which is electrically connected to the first subpixel, wherein the first subpixel includes a first light emitting element, a first driving transistor, a first scan transistor and a first sensing transistor, a first node of the first driving transistor is electrically connectable to the first data line through the first scan transistor, and a second node of the first driving transistor is electrically connectable to the first reference voltage line through the first sensing transistor, and wherein, a first period for driving the first sub-pixel includes an initialization period, a tracking period, and a sampling period, and in the initialization period, a voltage difference between a sensing driving data voltage supplied to the first data line and a sensing driving reference voltage supplied to the first reference voltage line is set to correspond to a threshold voltage of the first driving transistor in the first subpixel identified from threshold voltage-related information stored in a memory, and in the tracking period that proceeds after the initialization period, a voltage of the second node of the first driving transistor increases, and in the sampling period that proceeds after the tracking period, the voltage of the second node of the first driving transistor is supplied to the first reference voltage line.

2. The display device of claim 1, wherein the first period is included in a blank time period between active time periods.

3. The display device of claim 1, wherein, before the first period for the first subpixel proceeds, a threshold voltage sensing time period for sensing a threshold voltage of the first driving transistor proceeds, and as the threshold voltage sensing time period proceeds, the threshold voltage-related information is stored or updated in the memory.

4. The display device of claim 3, wherein a threshold voltage of the first driving transistor during the first period has a voltage value lower than a threshold voltage of the first driving transistor during the threshold voltage sensing time period before the first period.

5. The display device of claim 3, wherein, during the first period for a second subpixel different from the first subpixel, a voltage of a second node of a second driving transistor included in the second subpixel does not vary or varies within a selected level.

6. The display device of claim 5, wherein a threshold voltage of the second driving transistor during the first period for the second subpixel has a voltage value the same as or greater than a threshold voltage of the second driving transistor during the threshold voltage sensing time period before the first period for the second subpixel.

7. The display device of claim 1, further comprising:

a data driving circuit configured to supply the sensing driving data voltage to the first data line, wherein the data driving circuit comprises:

an analog-to-digital converter configured to sense a voltage of the first reference voltage line;

a sampling switch configured to control connection between the first reference voltage line and the analog-to-digital converter; and an initialization switch configured to control connection between a sensing driving reference voltage supply node supplied with the sensing driving reference voltage and the first reference voltage line.

8. The display device of claim 2, wherein the first period proceeds during a first blank time period, a second period for a second subpixel proceeds during a second blank time period different from the first blank time period, and during the second period, a voltage of a second node of a second driving transistor included in the second subpixel rises and before a voltage of the second node of the second driving transistor rises, a voltage difference between a sensing driving data voltage supplied to a corresponding data line and a sensing driving reference voltage supplied to a corresponding reference voltage line does not correspond to a threshold voltage of the second driving transistor in the second subpixel identified from the threshold voltage-related information stored in the memory.

9. The display device of claim 8, wherein, during the second period, a voltage rising speed of the second node of the second driving transistor corresponds to a mobility of the second driving transistor.

* * * * *